(12) United States Patent
Vilcovsky et al.

(10) Patent No.: US 8,982,109 B2
(45) Date of Patent: Mar. 17, 2015

(54) DEVICES, SYSTEMS AND METHODS OF CAPTURING AND DISPLAYING APPEARANCES

(71) Applicants: Nissi Vilcovsky, Tokyo (JP); Ofer Saban, Vienna, VA (US)

(72) Inventors: Nissi Vilcovsky, Tokyo (JP); Ofer Saban, Vienna, VA (US)

(73) Assignee: Eyesmatch Ltd, Road Town, Tortola (VG)

( * ) Notice: Subject to any disclaimer, the term of this patent is extended or adjusted under 35 U.S.C. 154(b) by 169 days.

(21) Appl. No.: 13/843,001

(22) Filed: Mar. 15, 2013

(65) Prior Publication Data
US 2013/0229482 A1    Sep. 5, 2013

Related U.S. Application Data

(63) Continuation-in-part of application No. 13/088,369, filed on Apr. 17, 2011, now Pat. No. 8,624,883, which is a continuation of application No. 11/817,411, filed as application No. PCT/IL2006/000281 on Mar. 1, 2006, now Pat. No. 7,948,481.

(60) Provisional application No. 60/656,884, filed on Mar. 1, 2005, provisional application No. 60/656,885, filed on Mar. 1, 2005, provisional application No. 61/738,957, filed on Dec. 18, 2012.

(51) Int. Cl.
*G06F 3/038* (2013.01)
*H04N 7/15* (2006.01)
(Continued)

(52) U.S. Cl.
CPC .. *H04N 7/15* (2013.01); *G02B 5/08* (2013.01); *G09F 19/16* (2013.01); *G09F 27/00* (2013.01); *H04N 7/144* (2013.01); *G06F 3/011* (2013.01); *H04N 1/622* (2013.01); *G06T 3/00* (2013.01); *H04N 5/2624* (2013.01); *A47F 2007/195* (2013.01); *H04N 2005/2726* (2013.01); *H04N 5/2628* (2013.01)

USPC .......................... 345/204; 345/212; 345/214

(58) Field of Classification Search
CPC ............ G06F 3/005; G06F 3/01; G06F 3/011
USPC ............... 345/204–215; 348/333.01; 434/395
See application file for complete search history.

(56) References Cited

U.S. PATENT DOCUMENTS 5,230,039 A    7/1993    Grossman et al.
5,551,021 A    8/1996    Harada et al.
(Continued)

FOREIGN PATENT DOCUMENTS

DE    19943355 A1    3/2001
DE    10031965 A1    1/2002
(Continued)

OTHER PUBLICATIONS

Search Report for European Patent Application No. 06711263.1 dated Aug. 18, 2011.
(Continued)

*Primary Examiner* — Vijay Shankar
(74) *Attorney, Agent, or Firm* — Nixon Peabody LLP; Joseph Bach, Esq.

(57) ABSTRACT

Systems, devices and methods enabling appearance comparison. The system includes at least one interactive imaging and display station. The station includes a mirror-display device capable of selectably operating in either or both a mirror mode or a display mode; an imaging device to capture one or more appearances appearing in a field of view in front of the mirror-display device; and/or an image control unit to select the mode of operation of the mirror-display device according to a user command.

18 Claims, 18 Drawing Sheets

(51) Int. Cl.
*G02B 5/08* (2006.01)
*G09F 19/16* (2006.01)
*G09F 27/00* (2006.01)
*H04N 7/14* (2006.01)
*G06F 3/01* (2006.01)
*H04N 1/62* (2006.01)
*G06T 3/00* (2006.01)
*H04N 5/262* (2006.01)
*A47F 7/19* (2006.01)
*H04N 5/272* (2006.01)

(56) References Cited

U.S. PATENT DOCUMENTS

| | | | |
|---|---|---|---|
| 5,923,776 | A | 7/1999 | Kamgar-Parsi |
| 5,937,081 | A | 8/1999 | O'Brill et al. |
| 6,195,467 | B1 | 2/2001 | Asimopoulos et al. |
| 6,366,694 | B1 | 4/2002 | Acharya |
| 6,417,850 | B1 | 7/2002 | Kang |
| 7,500,755 | B2* | 3/2009 | Ishizaki et al. ............ 353/28 |
| 7,874,481 | B2 | 1/2011 | Silverbrook et al. |
| 7,874,681 | B2* | 1/2011 | Huebner ............ 353/28 |
| 7,948,481 | B2 | 5/2011 | Vilcovsky |
| 8,000,727 | B1 | 8/2011 | Bushman et al. |
| 8,624,883 | B2 | 1/2014 | Vilcovsky |
| 2002/0049546 | A1 | 4/2002 | Shimomura |
| 2002/0196333 | A1 | 12/2002 | Gorischek |
| 2003/0085866 | A1 | 5/2003 | Bimber et al. |
| 2003/0110099 | A1 | 6/2003 | Trajkovic et al. |
| 2003/0146901 | A1 | 8/2003 | Ryan |
| 2005/0018140 | A1 | 1/2005 | Ishizaki et al. |
| 2005/0047629 | A1 | 3/2005 | Farrell et al. |
| 2005/0259158 | A1 | 11/2005 | Jacob et al. |
| 2006/0007303 | A1 | 1/2006 | Milton |
| 2006/0158534 | A1 | 7/2006 | Gotohda |
| 2006/0178902 | A1 | 8/2006 | Vicars et al. |
| 2007/0040033 | A1 | 2/2007 | Rosenberg |
| 2007/0120954 | A1 | 5/2007 | Allen et al. |
| 2007/0132863 | A1 | 6/2007 | Deguchi |
| 2008/0056564 | A1 | 3/2008 | Lindbloom |
| 2008/0151092 | A1 | 6/2008 | Vilcovsky |
| 2009/0051779 | A1 | 2/2009 | Rolston |
| 2009/0091710 | A1 | 4/2009 | Huebner |
| 2010/0097442 | A1 | 4/2010 | Lablans |
| 2010/0169411 | A1 | 7/2010 | Colton et al. |
| 2010/0190510 | A1 | 7/2010 | Maranhas et al. |
| 2010/0191578 | A1 | 7/2010 | Tran et al. |
| 2011/0199294 | A1 | 8/2011 | Vilcovsky |
| 2011/0210970 | A1 | 9/2011 | Segawa |
| 2012/0120184 | A1 | 5/2012 | Fornell et al. |
| 2012/0154872 | A1 | 6/2012 | Reddy |
| 2012/0169850 | A1 | 7/2012 | Kim et al. |
| 2012/0177284 | A1 | 7/2012 | Wang |
| 2012/0229637 | A1 | 9/2012 | Mooradian et al. |
| 2012/0233089 | A1 | 9/2012 | Calman et al. |
| 2013/0083015 | A1 | 4/2013 | Hernandez Esteban |
| 2013/0088562 | A1 | 4/2013 | Hong et al. |
| 2014/0225977 | A1 | 8/2014 | Vilcovsky et al. |
| 2014/0225978 | A1 | 8/2014 | Saban et al. |
| 2014/0226000 | A1 | 8/2014 | Vilcovsky et al. |
| 2014/0226900 | A1 | 8/2014 | Saban et al. |

FOREIGN PATENT DOCUMENTS

| | | |
|---|---|---|
| EP | 1372092 A1 | 12/2003 |
| EP | 1376207 A1 | 1/2004 |
| EP | 1859432 A2 | 11/2007 |
| WO | 00/22955 A1 | 4/2000 |
| WO | 2006/092793 A2 | 9/2006 |
| WO | 2014/100250 A2 | 6/2014 |

OTHER PUBLICATIONS

Examination Report for European Patent Application No. 06711263.1 dated Jun. 21, 2012.
2nd Examination Report for European Patent Application No. 06711263.1 dated Jun. 25, 2013.
International Search Report and Written Opinion for PCT/IL2006/000281 mailed on Jun. 12, 2007.
International Preliminary Report on Patentability for PCT/IL2006/000281 mailed on Sep. 20, 2007.
Office Action for U.S. Appl. No. 13/088,369 mailed on Nov. 2, 2012.
Office Action for U.S. Appl. No. 13/088,369 mailed on Apr. 9, 2013.
Notice of Allowance for U.S. Appl. No. 13/088,369 mailed on Sep. 3, 2013.
Office Action for U.S. Appl. No. 11/817,411 mailed on Jul. 21, 2010.
Notice of Allowance for U.S. Appl. No. 11/817,411 mailed on Feb. 3, 2011.
Decision to Refuse for European Patent Application No. 06711263.1 dated Nov. 4, 2014.
International Search Report and Written Opinion for PCT/US2013/076253 dated May 6, 2014.
Notice of Allowance for U.S. Appl. No. 14/253,800 dated Oct. 24, 2014.
Invitation to Pay Additional Fees and, Where Applicable, Protest Fee for PCT/US2014/034333 dated Aug. 8, 2014.
International Search Report and Written Opinion for PCT/US2014/034333 dated Dec. 17, 2014.
Notice of Allowance for U.S. Appl. No. 14/253,827 dated Dec. 15, 2014.
Notice of Allowance for U.S. Appl. No. 14/253,831 dated Dec. 3, 2014.

* cited by examiner

US 8,982,109 B2

DEVICES, SYSTEMS AND METHODS OF CAPTURING AND DISPLAYING APPEARANCES

CROSS REFERENCE TO RELATED APPLICATIONS

This application is Continuation-in-Part of U.S. application Ser. No. 13/088,369, filed Apr. 17, 2011, which is a continuation of U.S. application Ser. No. 11/817,411, now U.S. Pat. No. 7,948,481, issued May 24, 2011, and which was a National Phase Application of PCT International Application No. PCT/IL06/000281, International Filing Date Mar. 1, 2006, which claims the benefit of U.S. Provisional Application No. 60/656,884, filed Mar. 1, 2005, and U.S. Provisional Application No. 60/656,885, filed Mar. 1, 2005. This application further claims the priority benefit of U.S. Provisional Application No. 61/738,957, filed Dec. 18, 2012. The entire disclosures of all of the above listed applications are incorporated herein by reference.

BACKGROUND

1. Field

The invention relates generally to imaging and display systems and, more particularly, to monitors, and interactive displays, e.g., in retail and/or service environments, medical or home situations, video conferencing, gaming, etc. Specific implementations relate to making a flat panel display appear as a mirror. Another specific implementation relates to making a flat panel display provide a video of a person looking at his eyes to create an eye to eye video conference.

2. Related Art

Customers may shop for consumer articles, for example, apparel such as clothes, e.g., shirts, pants, coats and other garments, as well as shoes, glasses, and/or any other items or products, such as cosmetics, furniture and the like. Shopping normally takes place at a shopping facility, for example, retail stores. Prior to making a decision which article to buy, a customer may try on various articles (e.g., apparel, cosmetics) and/or pose with other background articles (e.g., furniture), and may view for each trial a user-appearance in front of a mirror, which may be located, for example, at a trial area of the retail store. For example, the customer may try on a first article, e.g., a suit, and view for that first trial his/her user-appearance in front of the mirror. Then, the customer may try on a second article, e.g., another suit. The customer may then need to memorize his/her user-appearance from the first trial in order to perform a mental comparison between the first article and the second article, thereby to evaluate which of the two articles might be a better fit for the customer.

Unfortunately, since the customer may try on numerous articles and/or since the second trial may take place a considerable amount of time after the first trial or even at a different store, the customer may not be able to recall his/her appearance for each trial and may therefore be required to repeatedly retry articles, e.g., items of apparels, previously tried on. This may result in a frustrating and inefficient shopping experience.

The conventional mirror (i.e., reflective surface) is the common and most reliable tool for an individual to explore actual self-appearance, in real time. A few alternatives have been proposed by prior art around the combination of a camera and a screen to replace the conventional mirror. However, these techniques are not convincing and are not yet accepted as a reliable image of the individual as if he was looking at himself in a conventional mirror. This is mainly because the image generated by a camera is very different from an image generated by a mirror.

When a user looks at himself in the mirror, what he actually sees is the reflection of himself as if he was standing at a distance that is double the distance from him to the mirror. This is illustrated in FIG. 5A, wherein the user standing at distance D1 sees himself at a distance equal to twice D1. Similarly, as shown in FIG. 5B, a user standing at distance D2 will see himself at a distance 2×D2. In addition, the angle of the user's Field of View (FOV) changes when the user changes the distance, e.g., gets closer, to the mirror. The FOV is limited by the specular reflecting angle ($\beta$) from the mirror to the user's eye and to the edge of the visible image on all sides of the mirror (four sides for a rectangular or square mirror). In FIG. 5B the bottom of the vertical FOV is illustrated as double the angle ($\beta$) formed by the lines connecting the user's eyes to the bottom of the mirror and reflecting to the user's shoes. Consequently, as illustrated in FIG. 5B, when the user approaches the mirror, the FOV angle increases, which is why he continues to see the same size reflection (FOV1<FOV2), so that the user actually sees himself roughly at the same size, but closer. This is a noticeable difference from a camera, wherein as the user gets closer to the camera, he appears larger in the image. This is mainly because the FOV of a camera is fixed and is determined mainly by the size of the camera lens, or focal length.

There are other phenomena to note regarding reflection of a mirror. For example, when the user approaches the mirror, the reflection of his eyes will always stay on the same virtual line into the mirror. Conversely, depending on a camera's height, as the user gets closer to the camera, the user's eyes may appear at different levels. Another difference from a camera is that when one looks at a mirror, one's image appears to be reversed (e.g., if one raises one's right hand, his left hand will appear to go up in the mirror). However, a mirror does not "swap" left and right any more than it swaps top and bottom. A mirror reverses the forward/backward axis (i.e., what's in front of the mirror appears to be behind the mirror), and we define left and right relative to front and back. Also, because the image in the mirror is virtual, the mirror can be smaller than the full body and the user will still see the reflection of his full body. The reason is that the specular reflection (in FIG. 5A the angle of incidence $\beta$ equals to the reflection angle $\beta$) can increase the effective field of view while the user approaches the mirror. Moreover, although the mirror is a two dimensional object, the user sees his appearance in three dimensions.

For at least some of the reasons noted above, so far no system has been provided for imitating a mirror convincingly. Imitating a mirror can have many applications in retail and other fields, and opens the possibility of incorporating real life experiences with virtual life experiences, such as sharing on social networks and other mobile technologies.

SUMMARY

Some demonstrative embodiments of the invention include devices, systems and/or methods enabling appearance comparison.

According to some demonstrative embodiments of the invention, a system enabling appearance comparison may include at least one interactive imaging and display station. The station may include, for example, a mirror display device capable of operating in either or both a mirror or a display mode; an imaging device to capture one or more appearances from a field of view in front of the mirror-display device;

and/or an image control unit to select the mode of operation the mirror display device according to a user command. The mirror display device may be in the form of a flat panel TV, wherein during mirror mode the TV presents a transposed live video feed from the camera, while during display mode it presents a transposed video taken at an earlier time and fetched from a memory.

According to some demonstrative embodiments of the invention the image control unit may include an input device to receive the user command.

According to some demonstrative embodiments of the invention, the image control unit may include a storage device to store data of one or more images which may correspond to one or more appearances.

According to some demonstrative embodiments of the invention, the mirror-display device may be capable of being partitioned into at least first and second simultaneously-displayable frames. The first frame may be selectably operable, for example, both in a mirror mode and a display mode. The second frame may be operable, for example, in a mirror mode.

According to some demonstrative embodiments of the invention, the imaging device may be capable of capturing three-dimensional images of appearances.

According to some demonstrative embodiments of the invention, the mirror-display device may be capable of displaying images of appearances at predefined sequences.

According to some demonstrative embodiments of the invention, the image control unit may be able to selectively enable a user access to images of appearances authorized to the user, e.g., based on user-identifying data received from the user.

According to some demonstrative embodiments of the invention, the at least one interactive imaging and display system may include two or more interactive imaging and display stations able to communicate over a network. For example, the two or more stations may be able to communicate between each other data representing images of appearances.

According to some demonstrative embodiments of the invention, the image control unit may control the mirror-display device to display, e.g., during the display mode, one or more images corresponding to the appearances. The one or more images may include, for example, one or more mirrored appearances. The mirrored appearances are obtained by transposing the images or video feed obtained from a camera to generate images and video that, when presented on a monitor, resembles an appearance in a mirror.

According to some demonstrative embodiments of the invention, a method enabling appearance comparison may comprise using a mirror mode of operation of a mirror-display device capable of being selectably operated in either a mirror or a display mode; capturing an image corresponding to an appearance of a first trial in front of the mirror-display device; storing the image of the first trial; selecting the display mode of operation of the mirror-display device; and/or retrieving the image of the first trial and displaying the image on the mirror-display device.

According to further embodiments, methods and apparatus are provided utilizing a camera and a flat screen display to create a convincing mirror appearance.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
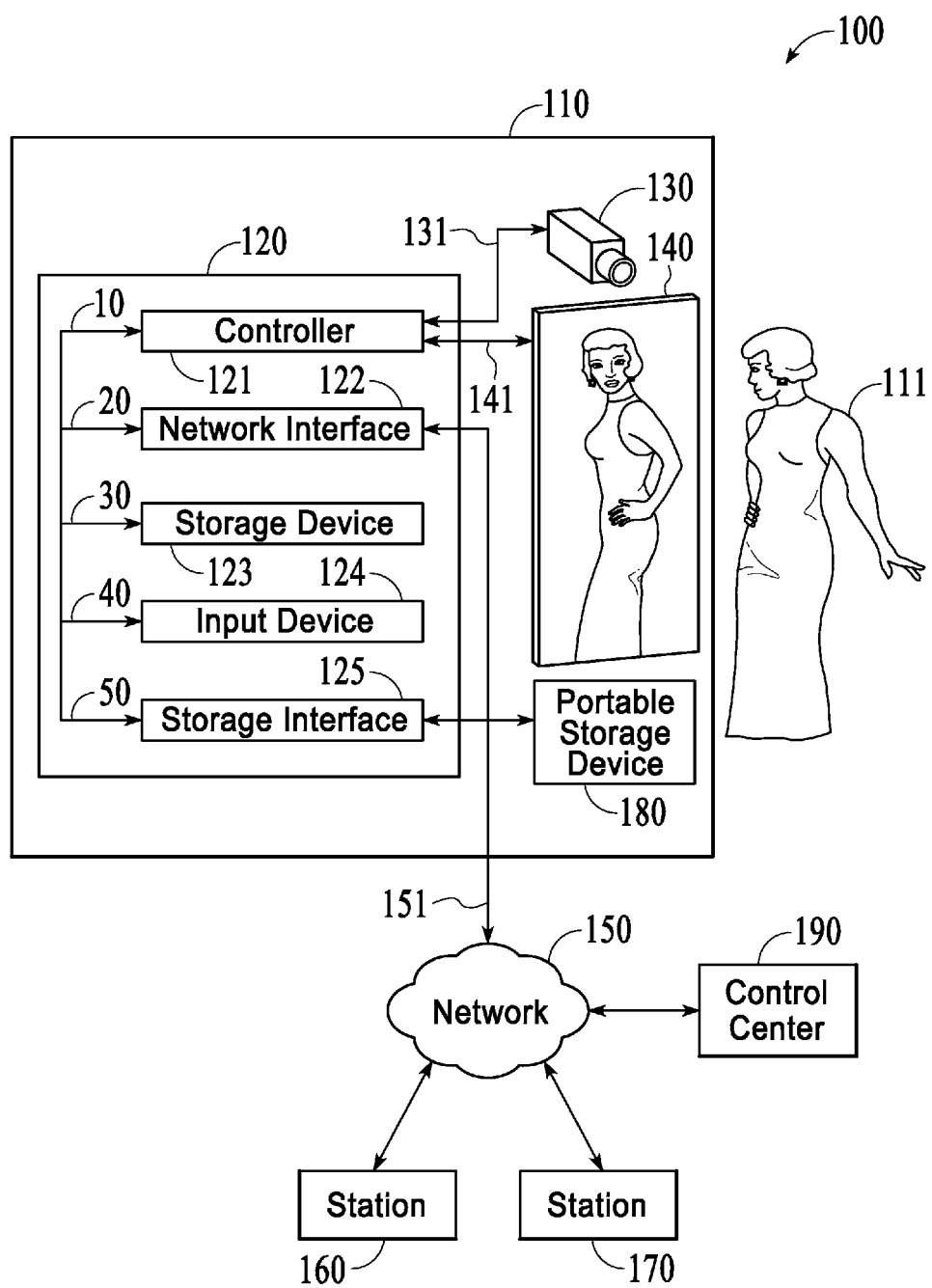
FIG. 1 is a schematic illustration of an interactive system enabling appearance comparison in accordance with some demonstrative embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Some demonstrative embodiments of the invention may include an interactive system enabling a user to compare one or more appearances, for example, to compare between different appearances, e.g., as described in detail below.

The term "user-appearance" as used herein may relate to the appearance of a customer while trying a consumer article. The article may include, for example, apparel, such as clothing, shoes, glasses, garments, ties, and the like; an article, e.g., furniture, located in the vicinity of the customer; as well as other items, articles, designs or products such as, for example, cosmetics, headdresses, haircuts, etc. Similarly, embodiments may be employed to technical usage, for example, for Fashion designers that want to see versions of designs, it can be for use by people at home who are creating a lifelong album of family members in real size, etc.

According to some demonstrative embodiments of the invention, the system may include an imaging device able to capture user-appearances and a mirror-display device, able to operate selectably as a mirror or as a display. When in the mirror mode, the mirror-display device may enable the user to evaluate and/or view a user-appearance of a current trial of a consumer article. As will be described further below, this can be done using live video feed to a flat panel display, wherein the video feed is modified prior to presentation on the screen, such that it emulates a mirror. When in the display mode, the mirror-display device may enable the user to evaluate and/or view one or more user-appearances, e.g., as previously captured by the imaging device, of a previous trial, e.g., as described in detail below.

Reference is made to FIG. 1, which schematically illustrates an interactive system 100 in accordance with some demonstrative embodiments of the invention.

According to some demonstrative embodiments of the invention, system 100 may include an interactive imaging and display station 110, which may include an image control unit 120, an imaging device 130 (e.g., a still or video camera), and a mirror-display device 140 (e.g., a flat panel display). Image control unit 120 may include a controller 121, a network interface 122, a storage device 123, an input device 124, all of which elements are described in detail below.

Aspects of the invention are described herein in the context of demonstrative embodiments of an imaging device, e.g., imaging device 130, a mirror-display device, e.g., mirror-display device 140, and/or an image control unit, e.g., image control unit 120, being separate units of an appearance comparison system, e.g., system 100. However, it will be appreciated by those skilled in the art that the invention is not limited in this respect, and that according to other embodiments of the invention, the system may include any suitable configuration, combination, and/or arrangement of the imaging device, the mirror-display device, and/or the image control unit. For example, the system may include an integrated module including the mirror-display device, the imaging device and/or the image control unit. For example, the imaging device and/or the image control unit may be implemented as integral part of the mirror-display device.

According to some demonstrative embodiments of the invention, mirror-display device 140 may be configured and/or may include components and mechanisms allowing mirror-display device 140 to operate selectably in two modes of operation. In a first mode of operation (the "mirror-mode"), mirror-display device 140 may operate as a mirror. In a second mode of operation (the "display mode"), mirror-display device 140 may operate as a display. When mirror-display device 140 operates in the mirror-mode, a user 111 of system 100 may evaluate and/or view a user-appearance of a first trial of a consumer article, as may be reflected by mirror-display device 140 in real time. Imaging device 130 may capture an image of the user-appearance of the first trial. The captured image may be stored, for example, by storage device 123, e.g., as described below. User 111 may then pose in front of mirror-display device 140 trying a second article, and imaging device 130 may capture a second image of the user-appearance of the second trial. The user may be able to view the second article in real time using the mirror-display device 140 set to mirror mode. When the mirror-display device 140 is switched to the display mode, mirror-display 140 may be controlled to display one or more of previously captured images. By virtue of the capability of mirror-display device 140 to operate selectably in the mirror or display mode, user 111 may be able to compare simultaneously or sequentially between the user-appearances of the first and second trials, as described in detail below.

In some demonstrative embodiments of the invention, e.g., as shown in FIGS. 1, 2A, 2B, 3A, and/or 3B, controller 121 may control device 140 to display, during the display mode of operation, a mirror-image of the appearances. However, it will be appreciated by those of ordinary skill in the art that the invention is not limited in this respect, and that in other embodiments the controller may control device 140 to display, during the display mode of operation, any other image corresponding to the appearance, e.g., a rotated appearance, a revered appearance, a substantially non-altered, e.g., frontal, appearance, a rendered appearance, and the like, e.g., as described below.

Device 140 may include any suitable configuration and/or mechanism to enable selectably operating mirror-display device 140 in the first and second modes of operation. For example, in one embodiment device 140 may include an array of liquid crystal (LC) elements, which may change their optical attributes such as, e.g., reflectivity, refractive index and the like, depending on, for example, a voltage applied to the liquid crystals. For example, applying a first voltage may result in changing the optical attributes of the liquid crystals such that mirror-display device 140 may operate as a mirror; and a second voltage may result in changing the optical attributes of the liquid crystals such that mirror-display device 140 may operate as a liquid crystal display.

In another embodiment of the invention, for example, mirror-display device 140 may include a liquid crystal display (LCD) device embedded in a semi-reflective or one-directional mirror. Accordingly, if the LCD is switched to an inactive mode of operation, mirror-display 140 may passively reflect sufficient light incident thereon to enable the user to view user-appearances at reasonable quality and brightness. In contrast, when the LCD is turned to an active mode of operation, images displayed by the LCD device may be viewed by user 111 because they may be significantly brighter than residual reflections from the surface of the mirror-display. In other embodiments, the system is implemented in a stand-alone computer, without the display itself, such that the purchaser of the system may supply its own display or have configurations where the system is used without screens, but remote controlled by customers mobile devices or tablets, so they can see their appearances in their mobile and remote controlled the recording.

Also in some cases the camera can be far from the display, for example, in luxury brands they might embed the screen in the wall and put the camera with appropriate lenses in a remote location.

According to some demonstrative embodiments of the invention, mirror display device 140 may be implemented by a LCD HD ready mirror TV such as, for example, model No. 32PM8822/10 available from Royal Philips Electronics, e.g., as described at the Internet site <http://www.research.philips.com/newscenter/archive/2003/mirrortv.html->. Such a device may include, for example, a polymer-based organic light-emitting display (OLED). Mirror-display device 140 may include any other suitable device implementing any suitable display technology. For example, device 140 may include a nano-emissive display (NED); a plasma display panel (PDP); a cathode ray tube display (CRT); a Digital Light Processing (DLP) display; a surface conduction electron emitter display (SED); a Tablet screen; a flat-panel SED; an Organic electronic display; electronic paper; a 3-Dimensional display, e.g., a Hologram display; a thin film resistor (TFT) display; an optical TFT; a Dot Matrix LED screen; an LCD having CCD capabilities, e.g., such that mirror-display 140 may be capable of performing the functionality of imaging device 130; a paintable LCD; a surface-conduction electron-emitter (SED) display; a high definition television (HDTV) display; a rear projector display device, and the like.

According to some demonstrative embodiments of the invention, imaging device 130 may be adapted to capture one or more appearances from a Field-of-View (FOV) in front of mirror-display device 140. The FOV in front of mirror-display device 140 may include, for example, a field, area, scene, zone, and/or region in front of mirror-display device 140. For example, the FOV may include at least part of a field, area, scene, zone, and/or region captured by mirror-display device 140 when in the mirror mode.

Although the scope of the present invention is not limited in this respect, imaging device 130 may be or may include, for example, a CCD camera, a video camera, a camera and/or camera set-up enabling capturing of 3D-images, e.g., a stereoscopic camera and the like. A stereoscopic camera may be adapted, for example, to capture a 3-D image of the user-appearance. The stereoscopic camera may include, for example, two lenses having a distance between each other that may correspond to a distance between two human eyes. Accordingly, the stereo camera may be able to simulate human binocular vision, also known as Stereophotography, thereby being able to capture a 3D-image.

According to some demonstrative embodiments of the invention, station 110 may be a stand alone unit, which may be located at an appearance-comparison area of a desired location, for example, an office, a home, or a retail store, e.g., apparel store.

According to other demonstrative embodiments of the invention, station 110 may be connected, e.g., via network interface 122, to a network, for example, a network 150, thereby enabling communication between station 110 and one or more other stations affiliated with network 150 such as, for example, station 160 and/or station 170.

According to some demonstrative embodiments of the invention, station 110 may include a network interface 122, which may be adapted to interact with network 150, to send and receive information from other stations in network 150, as described herein. Such information may include but is not limited to data corresponding to images of users captured at various stations of system 100, for example, station 160 and/or 170, as well as identifying information of the users to enable secure access to the system, as described in more detail below. Network 150 may include, for example, a local area network (LAN), a wide area network (WAN), a global communication network, e.g., the Internet, a wireless communication network such as, for example, a wireless LAN (WLAN) communication network, a Bluetooth network, a wireless virtual private network (VPN), a cellular communication network, for example, a 3.sup.rd Generation Partnership Project (3GPP), such as, for example, Frequency Domain Duplexing (FDD) network, a Global System for Mobile communications (GSM) network, a Wideband Code Division Multiple Access (WCDMA) cellular communication network, and the like.

According to some demonstrative embodiments of the invention, one or more of stations 160 and 170 may be portable devices. Non-limiting examples of such portable devices may include a mobile telephone, a laptop computer, a notebook computer, a mobile computer, a tablet computer, a Personal Communication Systems (PCS) device, Personal Digital Assistants (PDA), a wireless communication device, a PDA device which incorporates a wireless communication device, a cellular telephone, a wireless telephone, a smart card, a token, a memory card, a memory unit, and the like. In some embodiments of the invention, one or more of stations 160 and 170 may be non-portable devices such as, for example, a desktop computer, a television set, a server computer, and the like.

According to some embodiments of the invention, system 100 may also include a control center 190, which may be connected to stations 110, 160 and/or 170, e.g., via network 150. Control center 190 may receive and store data, which may represent, for example, data and/or images of user-appearances, received from one or more of stations 110, 160 and/or 170.

According to some embodiments of the invention, stations 110, 160 and/or 170 may be located at different locations such as, for example, different stores of a retail chain. In addition, stations 110, 160 and/or 170 may be located at different locations within a building, e.g., different floors, different sections at the same floor and the like. Such locations may include, for example, clothing stores, shoe stores, points of sale, concept showrooms, exhibitions, shopping malls, eyewear stores, cosmetic stores, sport clubs, health institutes, fitness centers, airports, train stations, coffee shops, restaurants, hotels, homes, and the like. One or more of stations 110, 160 and 170 may also be used for interactive billboard signs. For example, imaging device 130 may, for example, capture images which may be displayed on a billboard sign (not shown). System 100 may enable user 111 to choose an image to be displayed on the billboard sign out of a plurality of images of, for example, various previous trials of apparel.

According to some demonstrative embodiments of the invention, images of user appearances may be viewed at different locations. For example, imaging device 130 may capture an image of the first trial. The image may then be sent from network interface 122 via network 150 using signals 151 and 152, for example, to station 160. Accordingly, user 111 may be able to view the image of the first user-appearance at station 160. Therefore, user 111 may be able to view, for example, the user-appearance of the first trial in a first store of a retail store chain, e.g., a store associated with station 110; and may compare the user-appearance of the first trial with a user-appearance of a second trial, which may take place at a second store of the same or an affiliated chain, e.g., a store associated with station 160; and/or at a different time, e.g., one or more hours, days or weeks after the first trial.

According to another demonstrative embodiment of the invention, imaging device 130 may capture an image of a user-appearance of a first trial, and send the image via network interface 122 over network 150 to control center 190, where the image may be stored for later retrieval. Accordingly, user 111 may gain access to the images of the first trial by accessing any station, e.g., station 160, connected over network 150 with control center 190.

According to some demonstrative embodiments of the invention, storage device 123 may include, for example, a hard disk drive, a floppy disk drive, a Compact Disk (CD) drive, a CD-ROM drive, a Digital Versatile Disc (DVD) drive, or other suitable removable or non-removable storage units.

According to some demonstrative embodiments of the invention, controller 121 may be or may include, for example, a Central Processing Unit (CPU), a Digital Signal Processor (DSP), a microprocessor, a controller, a chip, a microchip, an Integrated Circuit (IC), or any other suitable multi-purpose or specific processor or controller, e.g., as are known in the art.

Input device 124 may include, for example, a keyboard; a remote control; a motion sensor; a pointer device such as, for example, a laser pointer; a mouse; a touch-pad; a touch screen, which may be embedded, for example, in mirror-display device 140, or may be implemented by any other suitable unit, e.g., separate from device 140; a biometric input device, e.g., a fingerprint scanner, and/or a camera for scanning a face; and/or any other suitable pointing device or input device. Input device 124 may be adapted to receive user-identifying data, for example, to enable, access, e.g., secure access, of user 111 to system 100, as described in detail below.

According to some demonstrative embodiments of the invention, user 111 may provide user commands to input device 124 for operating the imaging device 130. Input device 124 may include, for example, an interface to enable user 111 of system 100 to define operational parameters of imaging device 130. Controller 121 may receive the inputs from user 111 via signals 131 and control the operation of imaging device 130 accordingly. The user commands may include, for example, commands relating to the timing for capturing an image, the positioning of imaging device 130, e.g., according to an automatic tracking algorithm which may follow, for example, the position of user 111, and/or imaging attributes such as focus, camera position, capturing angle, dynamic range and the like. The user commands may also include commands to define image capturing operating modes of imaging device 130 such as, for example, a video capturing mode, a photographic mode and the like. According to some embodiments of the invention, imaging device 130 may include a sound input device, for example, a microphone and/or a sound output device, for example, a loudspeaker. Accordingly, imaging device may receive audio signals, e.g., voice signals generated by user 111, which may be recorded and stored, e.g., in storage device 123 and reproduce the audio signals through the sound output device. The sound output device may be able to reproduce any other kind of audio signals such as, radio programs, compact disc records and the like.

According to some demonstrative embodiments of the invention, controller 121 may, for example, set the mode of operation of mirror-display device 140 according to the command received from user 111. For example, if mirror-display device 140 operates in the mirror mode, the user of system 100 may provide input device with a switching command, e.g., by pressing a designated button at input device 124, for switching mirror-display device 140 to the display mode. Controller 121 may receive the input from input device 124 and may control device 140 to switch to the display mode of operation, e.g., using signals 141. According to some demonstrative embodiments of the invention, imaging device 130 may be mounted in various positions such as, for example, on top, below, or on the side of mirror-display device 140, thereby capturing an image of a user-appearance which may be an image of a given trial of apparel, an image of user 111 with various articles, e.g., furniture and/or posing with different garments and the like. In some embodiments of the invention, imaging device 130 may capture a user-appearance as it appears in mirror-display device 140, i.e., a mirror-image of the user-appearance. In other embodiments, imaging device 130 may capture the appearance, and controller 121 may generate a mirror-image corresponding to the appearance captured by imaging device 130. For example, storage 123 may store instructions that when executed by controller may result in any suitable method or algorithm of rotating, reversing, and/or mirroring the appearance captured by imaging device 130, thereby to generate image data representing rotated, reversed, and/or mirrored image of the image captured by device 130. According to these embodiments, controller 121 may control mirror-display device 140 to display, during the display mode of operation, the rotated, reversed, and/or mirrored image. In other embodiments, controller 121 may control mirror-display device 140 to display, during the display mode of operation, an image corresponding to the image captured by device 130, e.g., a non-mirrored, non-rotated, and/or non-reversed image. In some embodiments, imaging device 130 may not be visible to user 111, may be located behind display device 140, and/or may be embedded in mirror-display device 140, which may be or may include, for example, a LCD-CCD device capable of both displaying and capturing images. For example, in one demonstrative embodiment of the invention, device 140 may include an array, screen or surface, e.g., including liquid crystals, to perform the mirror-display functionality, e.g., as described above, as well as the imaging functionality of imaging device 130, e.g., device 140 may include a mirror-imaging-display device.

In some demonstrative embodiments of the invention, one or more of stations 110, 160 and/or 170 may not include image capturing device 130; and/or one or more of stations 110, 160 and/or 170 may not include mirror-display 140. For example, a first station of system 100 may include only imaging device 130, and may not include, e.g., mirror-display device 140. User 111 may use the first station to capture the image of the first trial of the user-appearance, e.g., without being able to view at the first station the resultant image of the first trial. User 111 may later view the captured image of the first trial at another station of system 100, which may include mirror-display device 140.

According to some demonstrative embodiments of the invention, imaging device 130 may be positioned in a manner enabling capturing of an image and/or a sequence of images, videos or the like, of a scene taking place in front of mirror-display device 140. Additionally or alternatively, imaging device 130 may positioned in a manner enabling capturing an image reflected from mirror-display device 140. For example, imaging device 130 may be able to capture an image of user 111 posing in front of mirror-display device 140. While posing in front of mirror-display device 140, user 111 may check his appearance of, e.g., a first fitting trial of clothes. According to an input provided by user 111 at input device 124, imaging device 130 may capture the image of the user-appearance which may be, for example, a given trial of apparel, e.g., a garment and the like. It may be noted that trials by user 111 may also include user 111 engaging with various subjects, which may be located in the vicinity of user 111 such as, furniture, studio set-up and the like. Accordingly, imaging device 130 may capture images of user-appearances of, for example, a first trial, a second trial, etc., and may send the respective captured images to storage device 123 via signals 131 and signals 30. User 111 may be able to retrieve the captured image of, e.g., the first trial, at a later time, e.g., following the second or other subsequent trials, and may compare between the first and second or other trial, e.g., as described below with reference to FIGS. 2A, 2B and 2C.

According to some demonstrative embodiments of the invention, storage device 123 may be adapted to receive data representing images captured by imaging device 130, and to store images of appearances and, more specifically, user-appearances of, for example, given trials of apparel, captured by imaging device 130. Images of given trials of user-appearances may be retrieved from storage device 123, e.g., by controller 121, and displayed by display 140. User 111 may compare between the displayed images, e.g., as described in detail below.

According to some demonstrative embodiments of the invention, storage device 123 may include data representing, e.g., software algorithms, requiring and/or verifying user identifying data such as user-ID, password, login-time, biometric data and the like to enable secure access to station 110, as described in detail below. For example, controller 121 may control mirror-display device 140 to display images corresponding to an identity of user 111, e.g., based on the identity data provided by user 111. For example, user 111 may provide input 124 with user-identifying input, which may include, for example, a biometric input such as face recognition, a hand print, a finger print, an eye print, voice recognition and the like. The user-identifying input may include any other suitable input, for example, a credit card, a personal identification number (PIN), a password, a smart card, a customer card, a club card, or the like. Controller 121 check, e.g., based on any suitable method and/or algorithm, whether the user-identifying input provided at input device 124 matches with user-identifying data which may be stored, e.g., in storage device 123 or in control center 190. Software having the capability of verifying a biometric input may be, for example, "Active ID FaceVision technology" provided by Geometric Inc. If controller 121 matches the input of user 111 with the stored user-identifying data, controller 121 may enable user 111 to access data representing, for example, images of previous user-appearances of user 111.

According to some demonstrative embodiments of the invention, storage device 123 may include data representing, e.g., software algorithms enabling additional system features such as, for example, rendering virtual effects on mirror-display device 140. For example, controller 121 may be able to render an image at mirror-display device 140 of user-appearances engaged and/or combined with virtual articles such as, for example, clothes, collections, headdresses, hair cuts, furniture and the like. In addition, controller 121 may be able to render an image at mirror-display device 140 of user-appearances having different body shapes for simulating, e.g., weight loss, weight gain of user 111 and the like. For example, user 111 may choose in a first trial a specific article, such as a suit out of a collection and controller 121 may virtually adjust the collection to an image of user 111 appearing in mirror-display device 140. Controller 121 may store the image of the first trial in storage device 123 and may perform the same step at a second trial. Accordingly, user 111 of system 100 may be able to compare between user-appearances of the first and a second trials of the collection.

According to some demonstrative embodiments of the invention, controller 121 may provide, for example, image and/or video browsing capabilities, image and/or video replay functions, which capabilities and functions may be predefined by system 100 or may be defined, e.g., on-the-fly, according to one or more user commands received from user 111 via input device 124. For example, controller 121 may be able to retrieve one or more images of previous user-appearances and display the images on mirror-display device 140 at various sequences. For example, images from previous trials may be displayed in a substantially continuous forward, backwards, or mixed, e.g., randomly-accessible, sequence, and/or may be a stepwise sequence or in any other sequence. Furthermore, images from previous trials may be displayed simultaneously at mirror-display device 140, e.g., as described below. Controller 121 may also be able to delete previously captured user-appearances, limit the amount of data which may be saved in storage device 123 and the like, and may further control a shape, size, color, etc., of the image displayed on mirror-display device 140.

According to some demonstrative embodiments of the invention, user 111 may use a portable storage device 180 able to store one or more of the captured images. The portable storage device may include any suitable portable storage device, e.g., a smartcard, a disk-on-key device, and the like. User 111 may download, for example, images represented by, e.g., signals 50, of a first trial of user-appearances from storage device 123, e.g., via a storage interface 125 or via any other suitable data connection. User 111 may then upload at a later time the image of, e.g., the first trial, to another location, e.g., a home of user 111, or another station of system 100, e.g., station 170.

In some embodiments of the invention, station 110 may include more than one mirror-display device or may include a mirror-display device 140, which may be partitioned simultaneously into two frames as described hereinafter with reference to FIGS. 2A and 2B.

According to some demonstrative embodiments of the invention, controller 121 may record or store, e.g., in storage 123, parameters characterizing user 111. For example, system 100 may include a weighing machine, connected to, e.g., storage device 123 via controller 121. Controller 121 may be able to record, for example, a weight of user 111 during, for example, a trial of an article. Accordingly, user 111 may later retrieve the parameter which may be, for example, the weight of user 111.

Figure 2A:
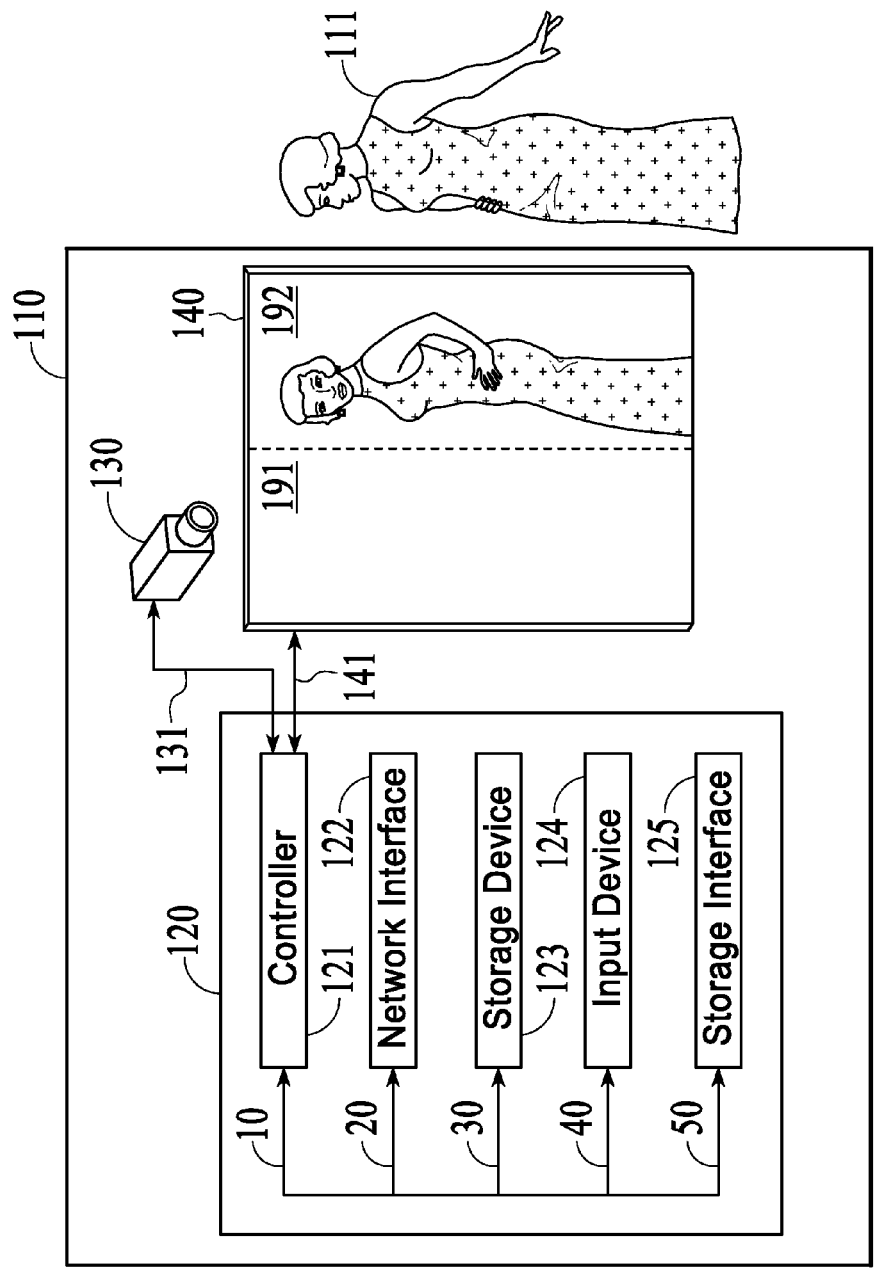
FIGS. 2A and 2B are schematic illustrations of two, sequential, stages of appearances comparison using an interactive system in accordance with some demonstrative embodiments of the invention.
Figure 2B:
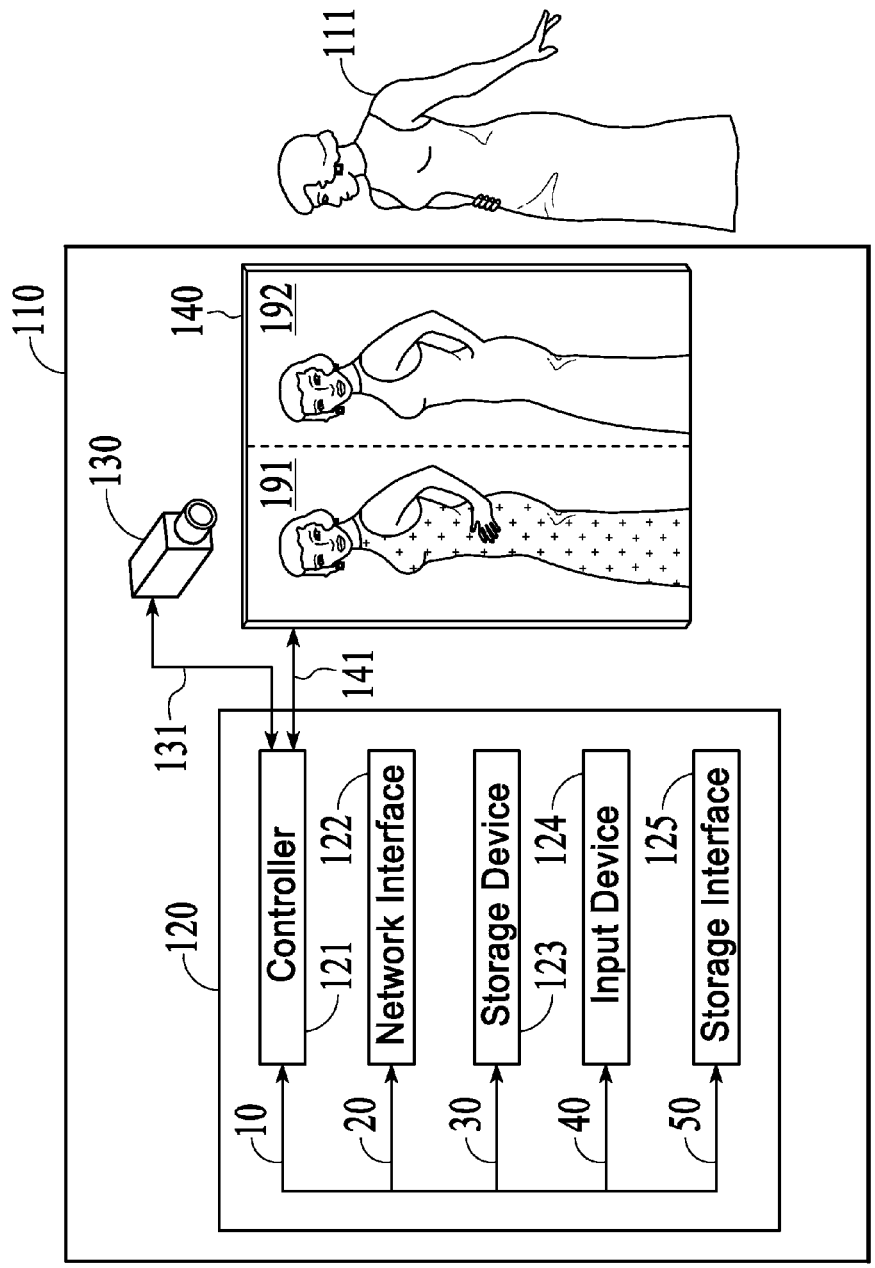

Reference is now made to FIGS. 2A and 2B, which schematically illustrate stages of comparing between appearances using an interactive system in accordance some demonstrative embodiments of the invention.

According to some demonstrative embodiments of the invention, mirror-display device 140 may be partitioned into two frames, wherein one frame may operate as a mirror frame 192 and another frame 191 may operate selectably as a mirror and as a display frame. As shown in FIG. 2A, user 111 may pose in front of mirror frame 192 a first trial, which may be captured by imaging device 130 and stored in storage device 123. Henceforward, as indicated in FIG. 2B, user 111 may view simultaneously in frame 191 the image of the user-appearance of the first trial and/or any other user-appearances, e.g., user-appearances stored in storage device 123 and/or received over network 150 (FIG. 1), side-by-side with the normal mirror appearance of a second trial in frame 192, and compare between the first and the second trial.

Figure 3A:
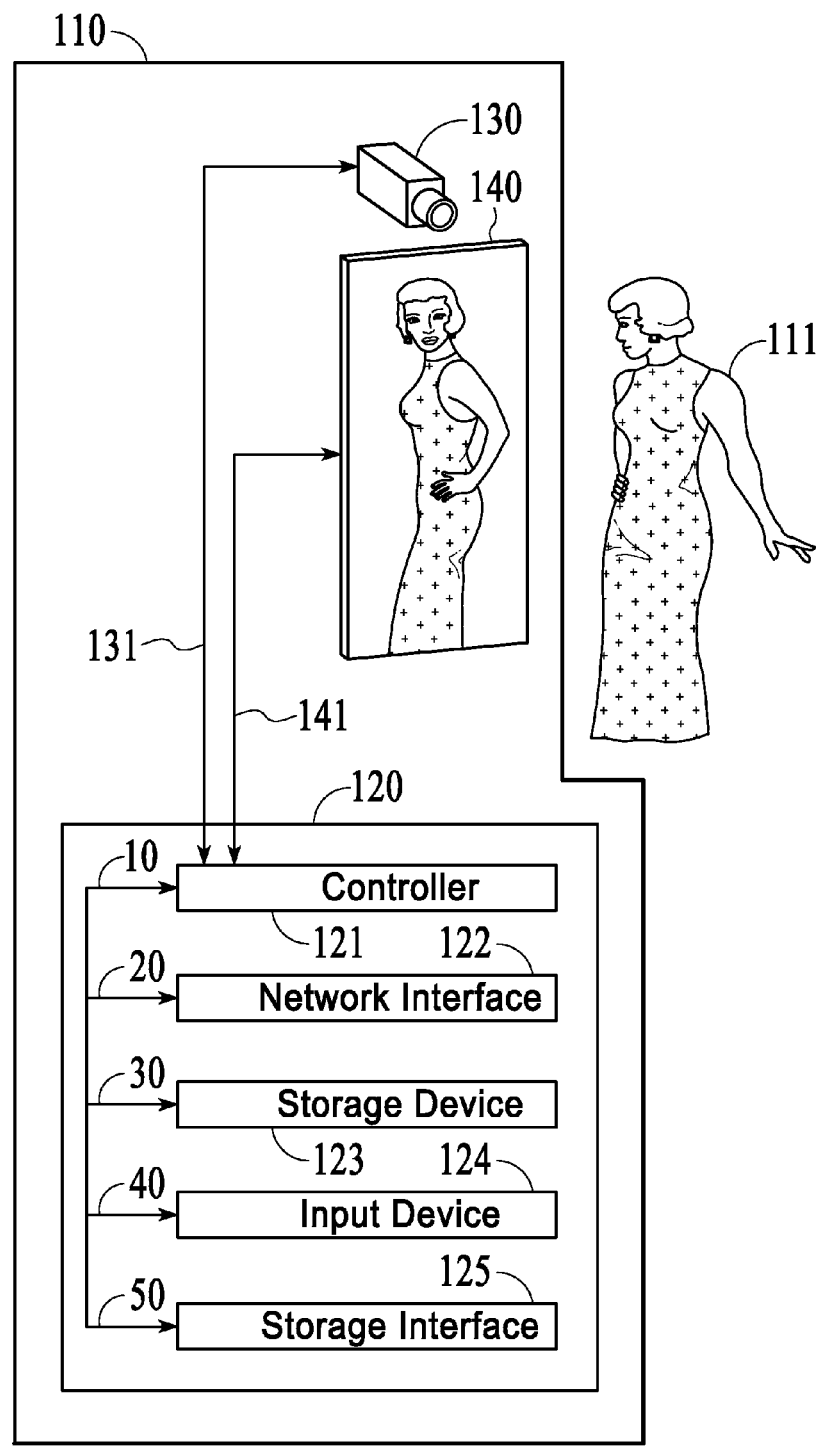
FIGS. 3A, 3B and 3C are schematic illustrations of three, sequential, stages of appearances comparison using an interactive system in accordance with some demonstrative embodiments of the invention.
Figure 3B:
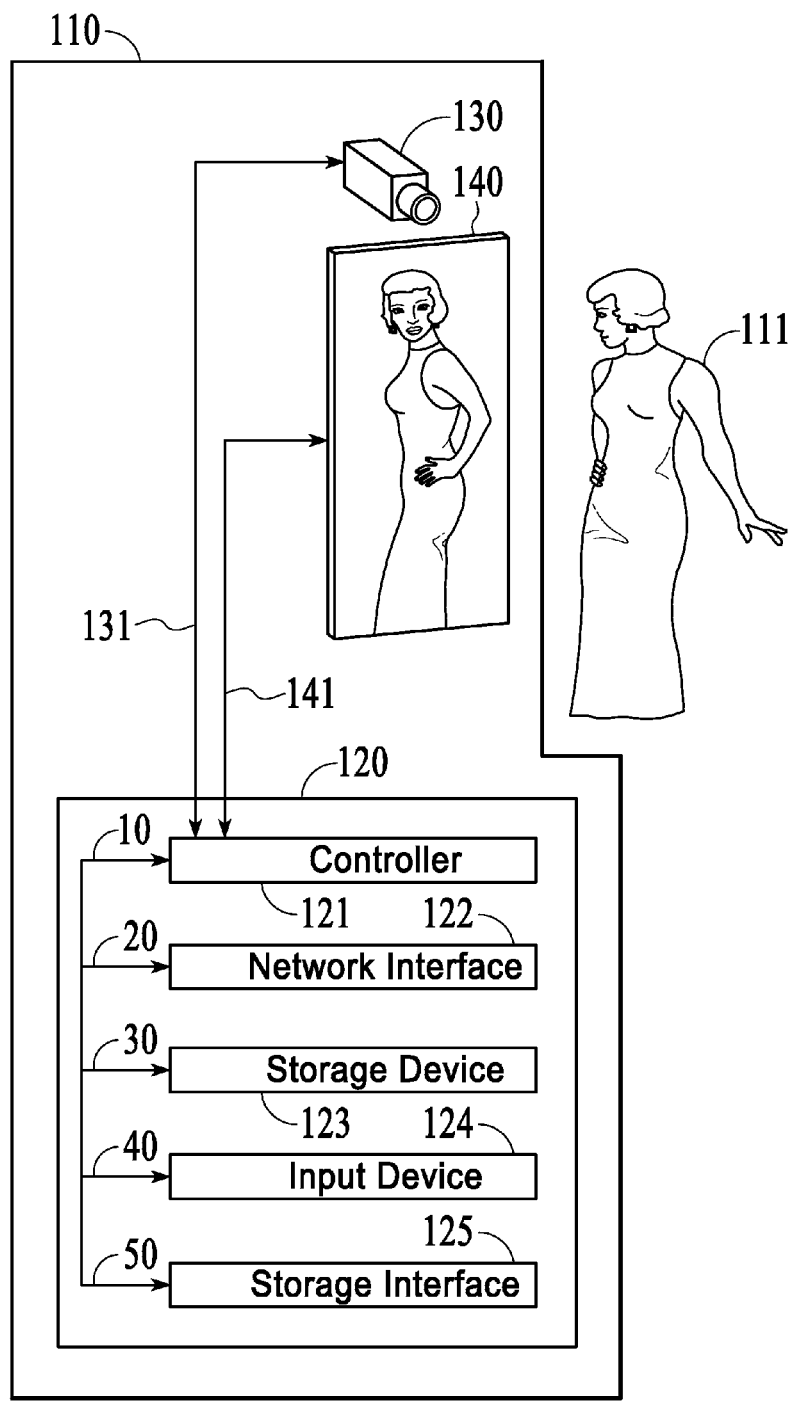
Figure 3C:
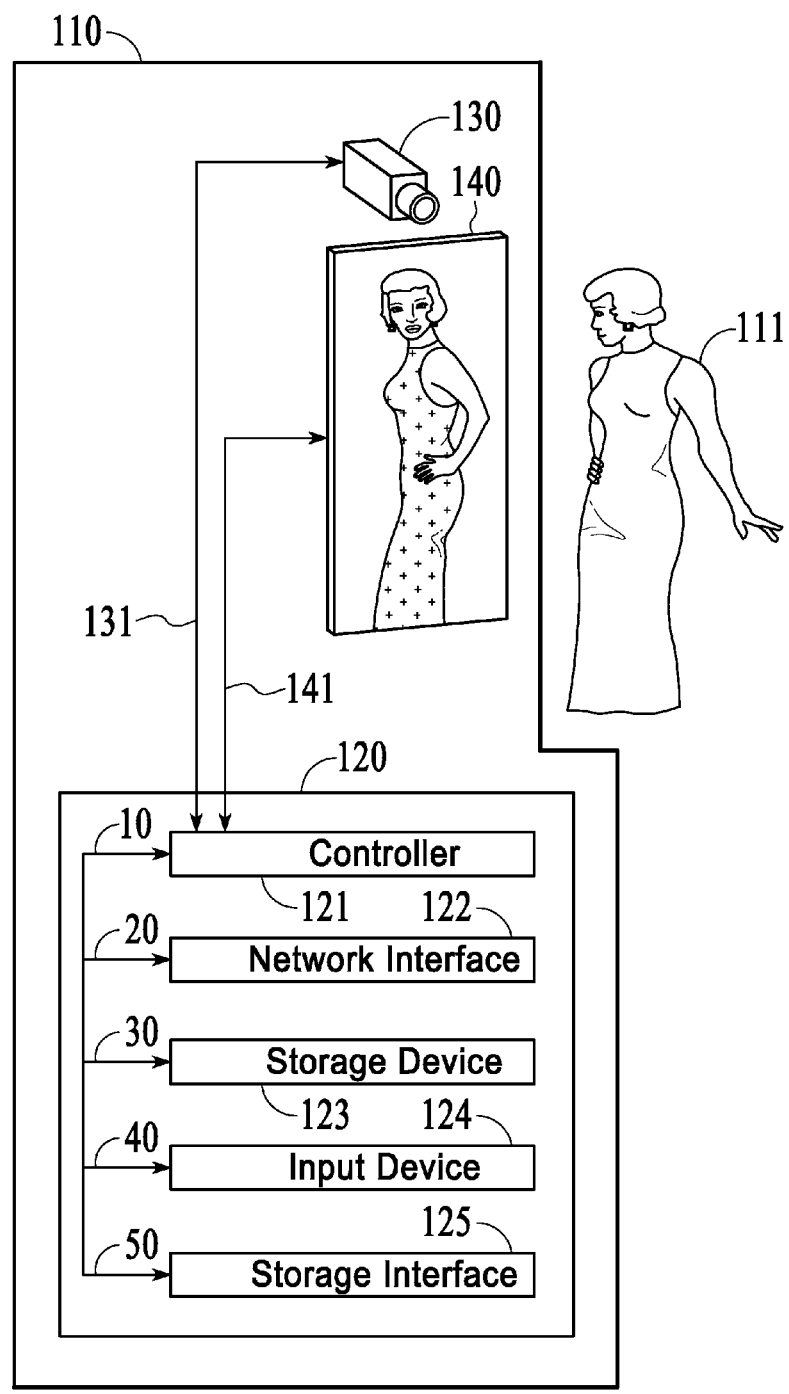

Reference is now made to FIGS. 3A, 3B and 3C, which schematically illustrate three, sequential, stages of comparing between appearances using an interactive system in accordance some demonstrative embodiments of the invention.

As shown in FIG. 3A, the user of system 100 may view a first trial of a user-appearance in mirror-display device 140 operating in its mirror mode. Controller 121 may receive, e.g., from input device 124, a user input, which may include a request to use imaging device 130 for capturing a first trial of the user-appearance. As a result, imaging device 130 may capture an image of the first trial of the user-appearance and storage device 123 may store the captured image.

As shown in FIG. 3B, user 111 may view a second trial of his user-appearance in mirror-display device 140, which may operate in the mirror mode of operation. Then, when user 111 desires to view a previous appearance, e.g., for comparison, controller 121 may receive a user input via input device 124 requesting to view the first trial. At this point, as shown in FIG. 3C, controller 121 may change the operational mode of mirror-display device 140 to the display mode using signals 141. Controller 121 may also control device 140 to display the first trial. Therefore, by switching between operating modes of mirror-display device 140, user 111 may compare the user-appearance of the second trial with the user-appearance of the first trial and/or any other user-appearances previously stored in storage device 123.

Figure 4:
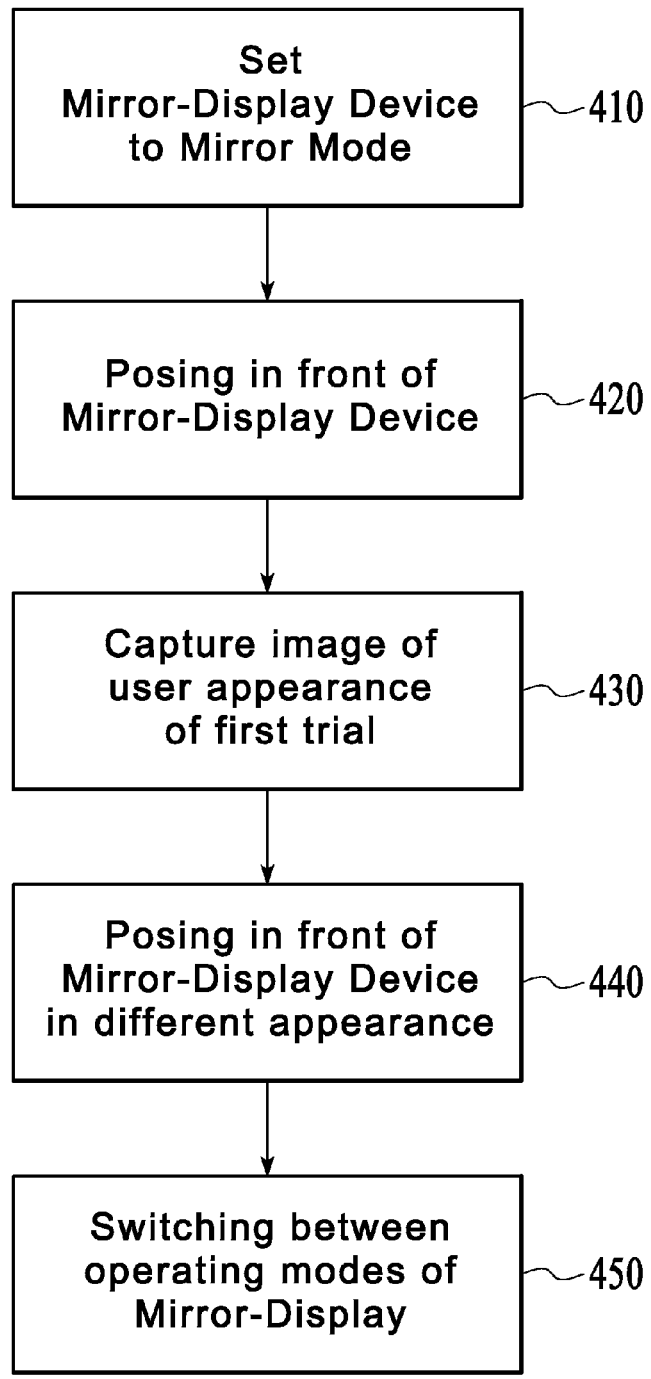
FIG. 4 is a schematic flow chart of a method enabling comparison of one or more user-appearances in accordance with some demonstrative embodiments of the invention.
Figure 5A:
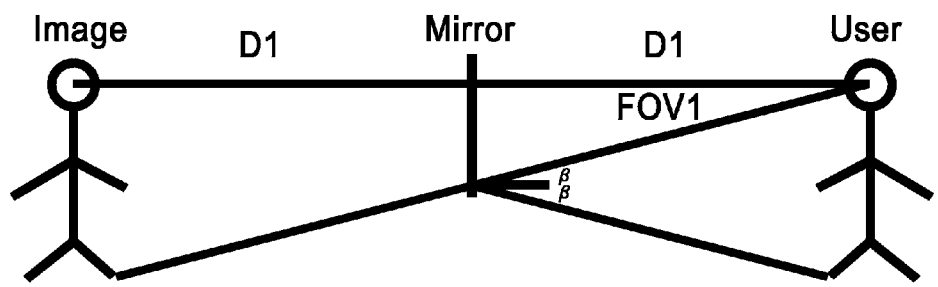
FIGS. 5A and 5B schematically illustrate mirror reflection.
Figure 5B:
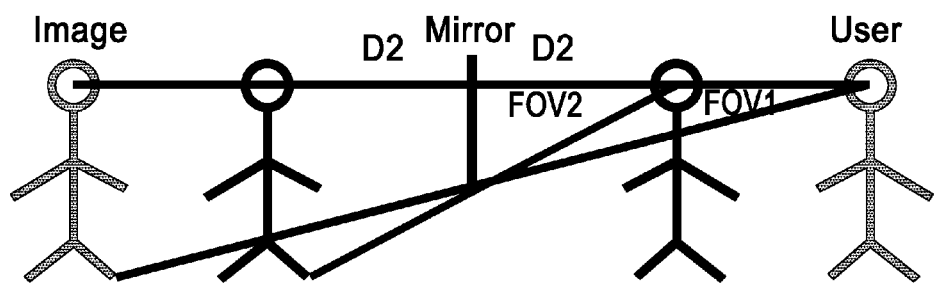

Reference is now made to FIG. 4, which schematically illustrates a flow-chart of a method enabling comparing between one or more various appearances in accordance with some demonstrative embodiments of the invention. Although the invention is not limited in this respect, one or more operations of the method of FIG. 4 may be performed by one or more elements of system 100 (FIG. 1).

As indicated at block 410, the method may include, for example, setting the operating mode of a mirror-display device. For example, user 111 (FIG. 1) may initially set the operating mode of mirror-display device 140 (FIG. 1) to the mirror mode. Alternatively, display 140 (FIG. 1) may be designed to operate in the mirror mode by default whenever a new user logs into system 100 (FIG. 1).

As indicated at block 420, the method may also include, for example, posing in front of the mirror-display device. For example, user 111 (FIG. 1) may pose in front of mirror-display device 140 (FIG. 1) and check the user-appearance of a first trial of, e.g., clothing, shoes and/or any other apparel.

As indicated at block 430, the method may also include, for example, capturing an image of the user-appearance of the first trial. For example, user 111 (FIG. 1) may provide user command to device 120 (FIG. 1) commanding imaging device 130 (FIG. 1) to capture an image of the user-appearance of the first trial.

As indicated at block 440, the method may also include, for example, posing in front of the mirror-display device in a different user-appearance. For example, user 111 (FIG. 1) may change one or more items of environment such as, for example, furniture and/or apparel, pose once again in front of mirror-display device 140 which may operate in mirror mode, and view a second user-appearance.

As indicated at block 450, the method may also include, for example, switching between operating modes of the mirror-display device. For example, user 111 (FIG. 1) may switch mirror-display device 140 (FIG. 1) between the mirror and the display mode. Accordingly, user 111 (FIG. 1) may be able to compare between the user-appearance of the first trial, and/or any other user-appearances, e.g., user-appearances stored in storage device 123 and/or received over network 150 (FIG. 1), and the user-appearance of the second trial.

According to some demonstrative embodiments of the invention, user 111 (FIG. 1) may indicate, and/or station 110 (FIG. 1) may be able to store, e.g., automatically, for each trial parameters, e.g., including shopping parameters, such as, for example, name of store, address of store, price, time and/or date of trial of apparel, name of salesperson, and the like. User 111 (FIG. 1) may, for example, store the captured images of user-appearances in a removable or portable storage device, e.g., as described above with reference to FIG. 1, and may later review images of user-appearances while being able to ascribe every image to, e.g., a specific store and the like. In addition, user 111 may define, and/or controller 121 (FIG. 1) may be able to generate, and/or store in storage device 123 reminders, for example, alarms about, e.g., discounts, end of season sales and the like.

We now present discussions relating to embodiment of using an image captured by a camera, e.g., a digital still or video camera, and manipulating the image such that when it is projected on a screen it resembles a mirror image, i.e., an image the user would have seen if the screen was actually a standard mirror.

Figure 6:
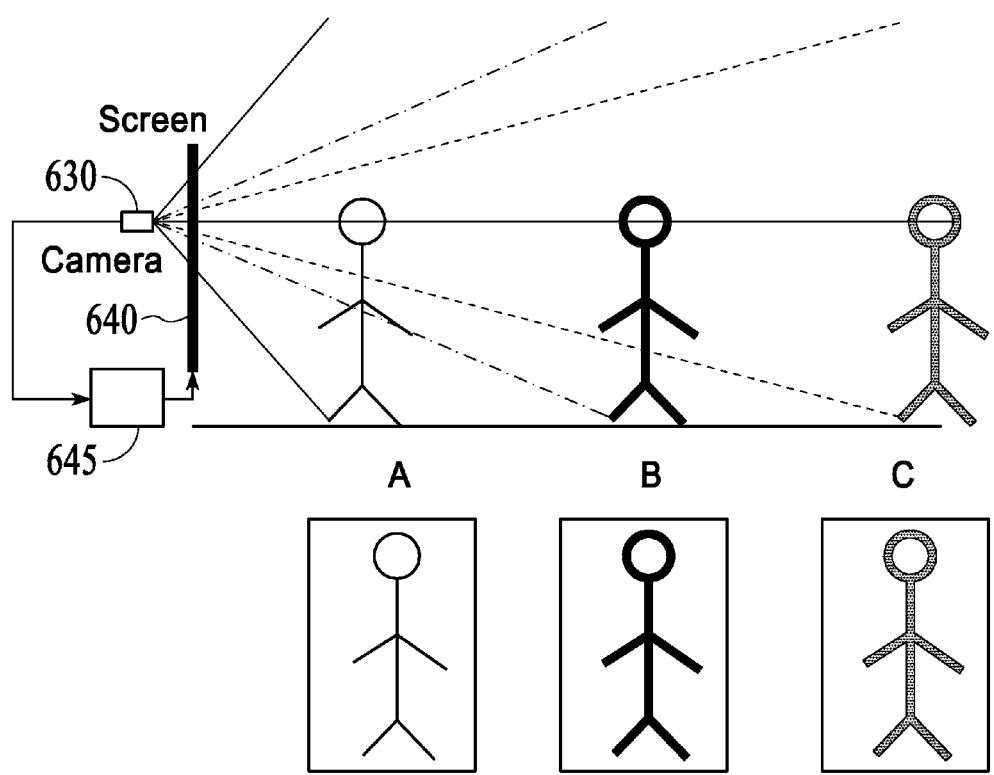
FIG. 6 illustrates an embodiment having one camera or multiple cameras in a vertical array at the user's eye level, so as to obtain low image distortion.

FIG. 6 is a schematic illustration for an understanding of the following embodiments, which includes a digital screen 640, a camera 630, and a computerized image processor 645, that could create a convincing mirror experience. In an ideal situation, the camera would be able to move on a parallel plane behind the screen, in correspondence with the user's eye location to create a convincing eye-to-eye look experience. However, it is not practical to locate a camera behind a regular screen, simply because it will block the camera's view. In theory, it is possible to overcome this problem by using a semitransparent screen or multiple pinholes with multiple cameras, though it may be too expensive and complex to implement. A simpler solution is to place the camera above the display screen and manipulate the captured image so as to mimic a mirror. Examples for the appropriate manipulations are provided below.

An adaptive FOV is required in order to compensate for the changes in the distances between the user and the screen, so that the user will see his image at the same size, just like in a mirror. According to one embodiment, this is solved by using the camera's zoom (digital and/or mechanical). Traditional cameras have fixed FOV or mechanically tunable FOV. In order to create an adaptive, i.e., continuously variable, FOV the system needs to manipulate the resolution, or to control the camera zoom and focus in real-time, based on user tracking.

Additionally, the image needs to be flipped vertically, to support the right-to-left behavior of the mirror. This image transformation may be performed relatively easily by manipulating the pixels addresses of a digital image.

As explained with respect to FIG. 1, the mirror can be smaller than the user and still show a full body reflection. This can be achieved in combination of proper selection of FOV and proper selection of the size screen. The idea is to project an image on the screen, which has a FOV giving the perception that the user sees a reflection at double the distance to the mirror, such that the entire body is visible even if the digital screen is smaller than the height of the user. This is exemplified by images A, B, and C in FIG. 6, showing an image of the user captured at different distances to the mirror, but showing the user's body at the same size by, among others, manipulating the FOV. In some embodiments, the image resolution also changes according to the user's distance to the mirror. For example, for close distances, one embodiment may use an array of cameras and the image manipulator would use stitching to reduce image distortion.

In order to support three dimensional imaging, the setup will require two cameras at a distance corresponding to the distance between the user's eyes, or one camera with two effective virtual points of view. A convincing 3D experience will also require the implementation of an adaptive closed-loop method that can change the creation of a 3D image as a function of the distance. When the user looks at his reflection in the mirror he sees himself in 3D, although when he approaches the mirror or walks away, the angle from his eyes to his reflection changes, which also changes the depth of the 3D image.

Figure 7:
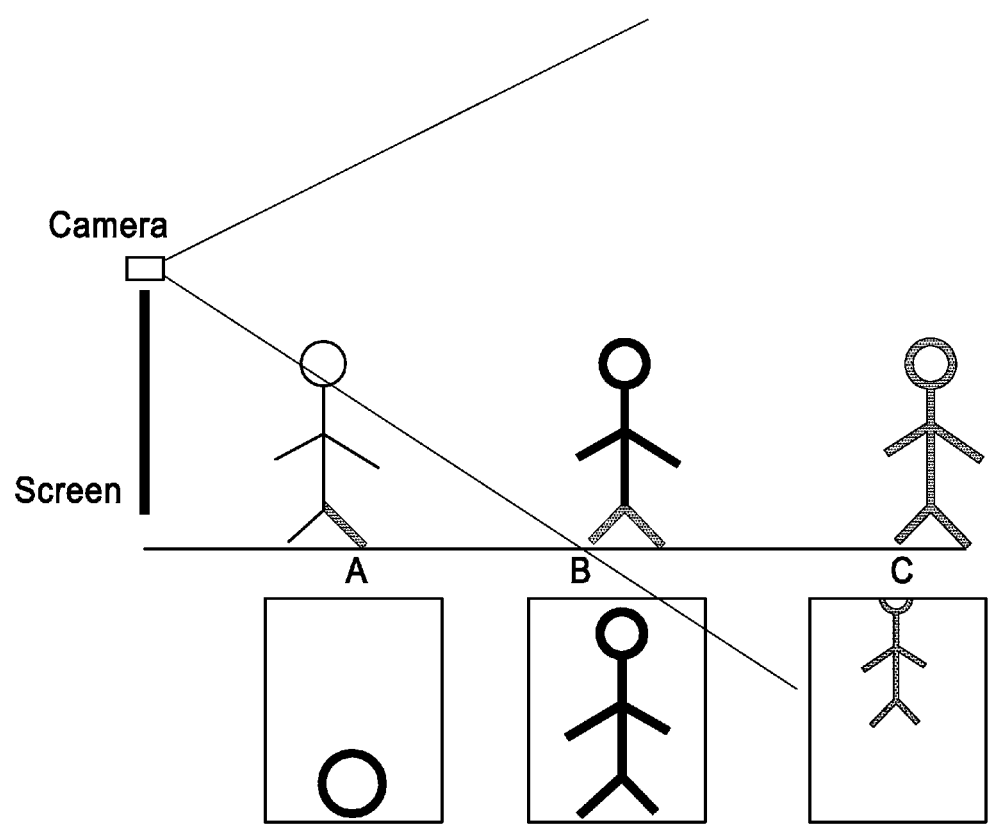
FIG. 7 is a schematic illustrating what happens when the user approaches the mirror or moves away from it when using a camera mounted above the screen and pointed horizontally.
Figure 8:
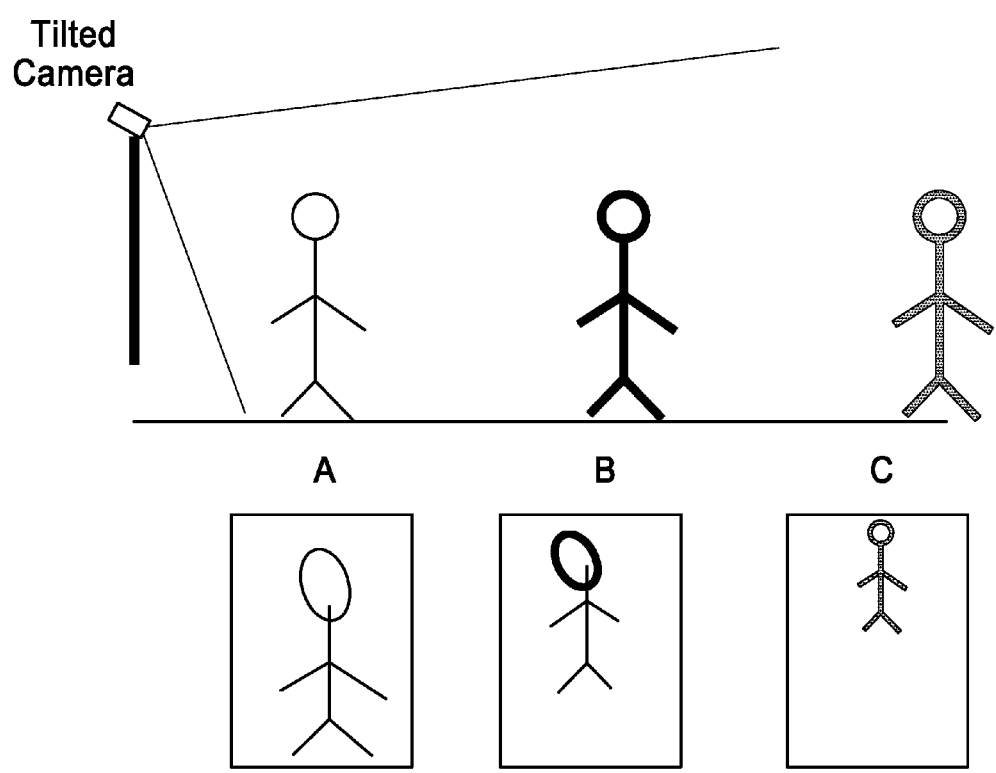
FIG. 8 is a schematic illustrating a system wherein the camera is positioned above a monitor screen and is tilted downwards.

As explained with reference to FIG. 6, it may be too complex or expensive to place the camera behind the display at eye level. Therefore, in the following embodiments a practical method is provided to implement the ideal system described above with a fixed-mounted camera/cameras located at the perimeter of the screen and facing the user. The main challenge is how to compensate for the image distortions adaptively and in real time, so as to create similar user experience as we would get in the ideal setup. FIGS. 7 and 8 show some examples of the challenges of using the practical setup with the camera placed above the digital screen, i.e., not corresponding to the user's eye level.

FIG. 7 depicts what happens when the user approaches the mirror or moves away from it when using a camera mounted above the screen and pointed horizontally. Assuming the system is calibrated to central dynamic range, when the user is far the image is smaller and higher (scenario C in FIG. 7) and when the user is closer to the screen (scenario A) the image of the user is larger and the FOV of the camera cuts the image of the user. Additionally, when the user approaches the screen, a projection distortion becomes noticeable, meaning that the user will not feel as if he is looking at himself in a mirror.

To enable capturing the entire body of the user at any distance, in one embodiment the camera is located at the top of the screen and tilted downwards to allow maximum dynamic range of the user's movement in front of the screen. As depicted in FIG. 8, because the camera is tilted downwards, the projection distortion is much larger and noticeable. The closer the user is to the camera, the more distorted his image becomes. The nature of the distortion is mainly projection distortion—the user look shorter and the upper body looks larger. In this configuration the image of the user also got smaller as he was further away from the screen. On the other hand, the effective/usable FOV of the camera will cover a larger area in front of the screen, and will allow the user to get much closer to the screen and still see an entire body image.

To enable generating a convincing (augmented) mirror experience from a camera a located in front of the user and in spatial offset from the screen, a computerized method is used to manipulate the captured image prior to its presentation on the screen. The computerized method may operate in real time or not in real time, depending on the operational mode of the screen.

The computerized method receives as an input the image captured by the camera and performs a transformation of the image to correct the point of view and field of view of the camera to fit with the view point that would occur with a conventional mirror. That is, when the user moves closer or further from the mirror, the view point that would have been reflected in the mirror would have been different from that captured by the camera. Embodiments of the inventive computerized method incorporate an adaptive POV (point of view) and Adaptive FOV modules based on tracking the position of the user.

Specifically, attempting to solve the virtual mirror problem by only flipping the image vertically as was proposed in the prior art is insufficient to create a mirror experience. When using a camera, once the user gets closer to the camera/screen the user's image becomes larger, and vice versa, as opposed to a conventional mirror where the user will always see himself roughly at the same size with a bit of a different FOV, regardless of his distance from the mirror. In addition, getting closer to the camera introduces image distortion that needs to be corrected in a much more advanced computerized method. Performing an adaptive POV and adaptive FOV prior to displaying the image on the screen results in an image that mimics a reflection of a mirror positioned at the location of the screen. Moreover, to obtain an even more convincing mirror experience, the following features may also be incorporated.

According to one embodiment, the computerized method further performs dynamic adaptive image stitching of images obtained from a plurality of cameras. According to this embodiment, the system incorporate multiple cameras, e.g., positioned at different locations and/or based on multiple technologies/characteristics, so as to improve the image resolution, accuracy of the image, extend the FOV of a single camera, reduce distortion for different users and different orientation of user, and create a better model for the user body mesh to compensate the camera's distortion. For example, because the image loses resolution as the user moves away from the screen (fewer pixels capture the user's image), it make sense to optically zoom and refocus the camera. The problem is that it comes at the expense of shrinking the camera's FOV. In order to improve resolution while maintaining FOV, a stitching or dynamic zoom can be implemented concurrently.

As mentioned in the preceding paragraph, to properly convey a mirror experience, the system may further implement an adaptive optical zoom. The adaptive optical zoom enhances the image/video's quality/resolution, based on distance tracking, i.e., continuously tracking the distance to the user. In addition, it reduces the asymmetric distortion that can occur if the camera is mounted on the side of the screen.

In order to ensure the accuracy of the image transposition, the platform can be calibrated in discrete pointers and the computerized method can interpolate and extrapolate the correct transformation on different positions in front of the screen. According to one embodiment, the projection distortion can be calculated in an analytical way based on user tracking and camera location. According to another embodiment, the image distortion is measured in front of the screen, and this measurement information is used instead of direct projection calculation.

The computerized method is optimized to reduce delay as much as possible by using, e.g., parallel computing and/or calculating the transformation per distance beforehand offline, such that when a distance to a user is measure, the mapping transformation is ready upfront. According to another embodiment, a straightforward approach is used without calibration, by analytically creating a projection transformation per user's calculated/measured point of view.

The following is a high-level description of the modules that together provide the mirror image transformation. The video acquisition module performs: grabbing the video, making video enhancements, camera optimization setting and control to get the best video quality under the available hardware limitations. The geometric measurements module measures or estimates any combination of distance to the user, the user height, identifies eye position and head pose, performs 3D body mash estimation, etc. The camera control module sets the camera for image/video quality and max resolution. In case of multiple cameras, optimization on FOV to get the max resolution will be done based user distance from each camera.

The geometric transformation module takes the video frame by frame, and the relevant user geometrical position/orientation information, and maps the raw images to the correct location and fills the blind pixel if there are any. For example, the geometric transformation is performed to match the eyes as if the user is looking at the mirror. That is, the computerized method calculates the right geometric transformation to distort the input video such that the user will look at himself and will feel that he is looking at his own eyes. This transformation is useful in other situation as well. For example, when performing video conference using computers, since the camera is positioned above the computer monitor or screen, the resulting image always shows the user looking downwards, since the user is actually looking at the computer monitor and not at the camera. Using the disclosed geometric transformation is such a situation would result in an image of the user as if he was looking at the camera, when in fact he is still looking at the screen. This would result in a more personalized conference environment. In the video conferencing application the geometric correction is similar to the mirror application though flipping image left right is not required.

The mapping transformation module can be implemented using various embodiments. According to one embodiment, a scaling approach is used, wherein geometric assumptions are used to make scaling correction per distance to the user, so as to match the size of the image that the user would see in a mirror. According to another embodiment, an image projection and scaling approach is used, wherein based on user distance, spatial offset and eyes location per distance and offset, projection transformation error between user/user-eyes and camera location is calculated or measured. Additional transformation can be made to correct optic distortion.

According to yet another embodiment, a registration approach is used, which has been shown to provide rather accurate results. According to this approach, the transformation is pre-programmed based on offline true registration technique of raw image from offset/projected/back oriented camera to an image that was taken in front of the user when the user eyes are staring at the camera. Reference image can be generated from one multiple cameras with stitching. For example, a reference camera will be located in a similar height and distance that will reduce most optic distortion, e.g., at eye level and 2-3m from the user. The registration will yield the best transformation to match the eyes and the full body based on multiple pointers. In one example, multiple pointers, e.g., white dotes, on a 2D or 3D calibration target, e.g., human/doll target will form a two-dimensional grid around central body. For example, circular stickers can be placed on the legs, on the chest, on the shoulders, on the eyes, etc. To improve accuracy, this registration can be repeated for multiple user locations/positions in front of the screen to account for, e.g., multiple spatial offsets from broadside, multiple heights, multiple distances, etc. For each location, the best mapping possible is created, assuming multiple distortions (projection, barrel, fisheye, or any combination, etc.) that can be corrected with multiple registration techniques (e.g., projection, affine transformation, similarity, polynomial, or any combination, etc.).

The above-described embodiments can be implemented in conjunction with the following further enhancement. Image stitching can be used with multiple cameras that are located so as to improve resolution quality, to minimize distortion from single camera, or to increasing field of view. Image stitching element will be integrated stitching based on user geometric location. Each camera will have its own transformation correction since the offset relative to the virtual eye location will be different. The multiple cameras can also be used to generate three dimensional view to improve the user experience.

A three-dimensional infrared (3D IR) image can also be generated. Such an image can be used to generate an accurate virtual model of the user, which can then be used to allow API for virtual dressing and augmented reality. Using augment reality, one can change the background, insert objects, perform virtual dressing of different clothes, etc. This may also be used to analyze the user body language and link it with the augmented reality applications, virtual dressing applications, gaming, video conferences, etc.

Since the system records the image, either still or video, various analytics can be performed on the images. For example, video analytics and/or store analytics can be used to collect information on the user or the store performance, e.g., how many times he smiled, did he enjoy the experience, estimated age, sex, ethnic origin, etc. Various inputs can be used for behavioral analysis platform that can help to integrate the eComerce into the real try-on experience, or as add on to any other application. For example, the system can analyze the user try-on item/items and linked it with the shop inventory, 3D printing, and the eComerce web, eComerce stylist, social network, etc.

Figure 9:
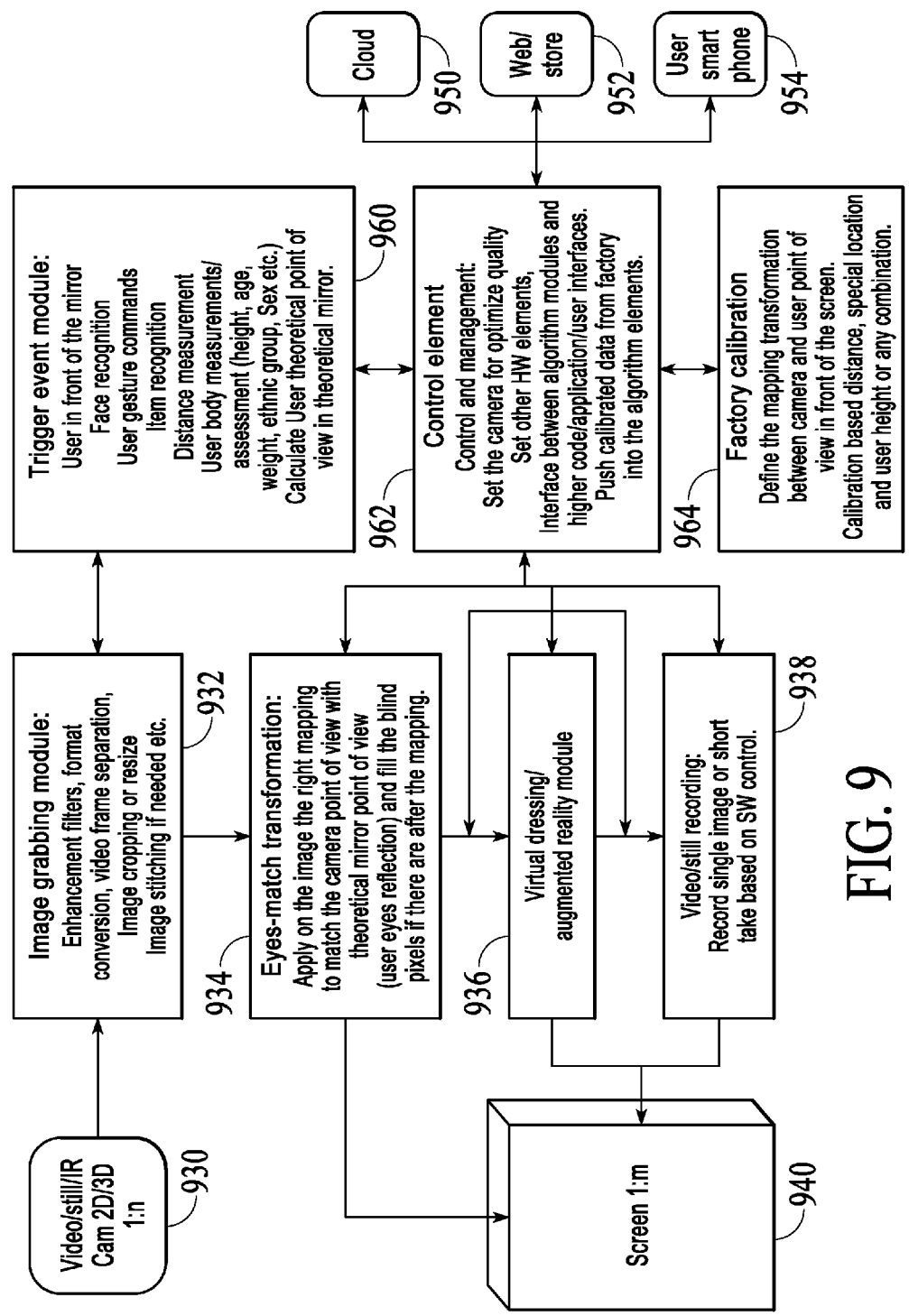
FIG. 9 is a block diagram of an embodiment of the invention which performs image transformation to generate an image that mimics a mirror.

Reference is now made to FIG. 9, which is a block diagram of an embodiment of the invention which performs image transformation to generate an image that mimics a mirror. The various modules of the system illustrated in FIG. 9 can be implemented on programmed general purpose computer, DSP, CPU, GPU, Camera DSP/ASIC, Screen DSP/ASIC, standalone computing device, FPGA card, DSP device, ASIC, cloud parallel computing, etc.

Block 930 represents one or more cameras 1:n, which stream the images to the image grabber module 932. Block 930 may include still and/or video cameras, IR camera, two and/or three-dimensional camera arrangements. A range finder, e.g., electroacoustic or electronic range finder, may also be included.

The image grabber module 932 captures the streamed images from block 930, and may apply filters to improve the image quality. Additionally, it may perform cropping or image resizing as needed for optimization of the image. If multiple cameras are used, the grabber module 932 applies image stitching as needed for better quality or wider effective field of view.

The trigger event module 960 is a parallel process that can get its input directly from the image grabber module 932, although it can also get the images after the eyes-match module 934. The input can be optimized in size, bandwidth and rate to perform the required functionality. Examples of elements that can reside in the trigger event module 960 include the following. Identify that a user is standing in-front of the camera 930, e.g., based on background subtracting and changes in a predefine zone, pattern recognition, etc. Measure the distance to the user by, e.g., correlation between stereo cameras, 3D IR camera, etc. According to another embodiment the distance to the user is estimated using a single camera measurement, by making some geometrical assumption, e.g., the user is roughly standing in front of the mirror and on a flat floor, so that the distance, the user height or the user theoretical point of view in a mirror, for example, can be deduce from measuring the location of the user's shoes and the user's special offset from the screen broadside.

A face recognition module may be included in order to ease the user interface identification. In operation, after registration the platform should save the information for each user, and once the user is recognized by the system, the system can upload the user's data, make updates, suggest items, etc. With face recognition the user doesn't have to identify himself, which saves time and enhances ease the use. The face recognition can be the trigger event for automatic recording of the appearances. In some embodiments, the length of the recording of each session is pre-defined and may start once the face recognition is successful. In other embodiments remote control technics can be used as trigger, such as a function in a mobile application or dedicated tablet/mobile/other remote control devices.

Other elements that can reside in the trigger event module 960 include video analytics (to create meaningful feedback, e.g., estimate age, sex, mood, other popular items, etc.), item recognition (so that the system can easily link the try-on items into the store, enhance inventory and eComerce platform for better recommendation and faster checkout and inventory planning), and gesture identification (for seamless user control without an input device).

The eyes-match transformation module 934 performs the image transformation prior to display on screen(s) 940. It gets as an input the image from the grabber module 932, and in addition, may receive the calculated distance or distance and height or actual user point of view. The eyes-match transformation module 934 calculates the required mapping. The required mapping can be calculated directly based calculation of the projection angle difference between camera and user theoretical point of view, e.g., matching the required image scale and positioning. Alternatively, a true-match approach that utilizes factory calibration process can be used to create a very accurate transformation between the camera and calculated point of view at discreet locations in-front of the mirror. Additionally, the base images and transformation that created per other one or more parameters, for example, distance, height, pose, measurements done in the factory, or real time when the user is standing in front of the screen, may also be used.

Based on user distance or the combination of user distance and eyes point of view, the eyes-match transformation module 934 creates interpolation of the transformation at any location in front of the camera. Since the distance of various parts of the user's body to the camera is not uniform, the projection distortion creates effect where closer body parts, like the head, are imaged by more pixels than far body parts, like the legs. Consequently, the user appears with shorted legs and large head, i.e., closer body parts appear larger and further body parts appear smaller. This mapping is not a linear, i.e., each pixel represent different area length and width (dx, dy), so pixel filling/under sampling decimation will have to be performed to maintain the axis proportion. Filling approach can be any interpolation (near, linear, cubic, polynomial etc.) or more complex filling from different camera projection. For example, cameras from above and below the screen can complement and better estimate the missing pixels or the correct eye orientation. Additional option is to perform some of the analysis in direct optic (special lens/prism) that will correct most of the projection distortion and will improve the resolution. Some of the resizing issue that affects the quality can also be compensate optically by mechanical zoom.

An optional virtual dressing/augmented reality module 936 can be included to enhance the user's experience. Module 936 gets its input from the EyesMatch module 934 or from the recording module 938. The EyesMatch module 934 performs a transformation of the image and will be explained in further details below. The EyesMatch module 934 can be used in various applications other than the mirror, such as for video cams, video conferences, etc. In addition, module 936 can get input elements to render from the CPU that maintains an active link with the inventory, a database, a 3D printing, eCommerce data base etc. Using the input data, module 936 can render digital images to be merged with the transposed image. For example, module 936 can be used to change an item's color based on actual try on and available inventory or user customization. It should be appreciated that module 936's rendering is different from regular virtual dressing, in that module 936 performs the rendering on an item that is imaged while on the user's body. Thus, for example, rendering the item in different color does not change the physical appearance of the item that the user is wearing, but only its color. Consequently, the user can feel the actual item on his body, see how it actually effects and changes his body shape and appearance, view actual folds and stretches, etc. Module 936 can also be used to add accessory to actual user's image or add true virtual dressing capability to the platform. Similarly, module 936 can be used to augment the background to change or create different environments to match the item the user wear, e.g., beach background for bathing suit, night club background for night dress, etc.

The video/stills recording module 938 receives its video/stills from the camera grabber 932 directly, from the Eyes-Match module 934, or from the virtual dressing augmented reality module 936. In addition, it gets control signals from the control module 962, that indicates when to start/stop recording, what information to store per user, and on what video/stills to process off line additional transformation/augment, reality/virtual dressing/quality enhancement, etc. The method that can be used for the recording without loading the system resources (CPU/BUS/GPU) can include encoding/decoding capabilities in the GPU cards.

In addition to having a local copy of the video/images in the Mirror Memory (station), the images can be automatically replicated to a Cloud Service and can be encoded automatically for any necessary size.

The recording process can also modify the frame rate, the compression, the cropping, change the formats, and modify video and color effects.

Other than recording, optionally the system can provide live streaming of the Mirror video. For example, the system will be able to show on the web in real-time streaming from any mirror, meaning that any device will be able to watch the streaming, including mirror to mirror.

Control module 962 controls the operation of all of the other modules. The control module 962 configures all of the hardware and software elements in the system, including the cameras 930, screen 940, DSP, etc. Control module 962 includes an interface, serving as a link between the local station and the cloud base eComerce 950, other web applications 952, smartphone applications 954, etc. The information that will be recorded on the recording module 938 can be delivered to the user immediately by wireless signals/IR/wire, or can be delivered by the user authorization to a cloud base application like Facebook, Google, or other, or to the company server that can be linked to the eComerce application.

Figure 10A:
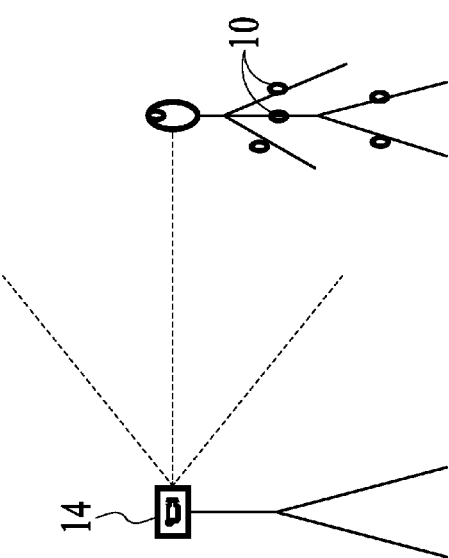
FIGS. 10A and 10B are schematics illustrating calibration processes according to embodiments of the invention.

The factory calibration module 964 is utilized when the transformation relies on actual image transforms. The camera to screen geometry orientation can be determined/measured in the factory, or can be measured in the field, and offsets can match the calibration with the factory condition. In addition, correction can be matched to height or angle of the mirror setup relative to the floor. The calibration process may be implemented as follows. The first step is to create a mirror reference of how the image should look like in the mirror at different discrete distances, special orientation, different eyes reflection location (i.e., theoretical point of view). The reference can be taken in multiple ways:

1. As illustrated in FIG. 10A, the camera 14 is located at the location of the "supposed" mirror and at the user's eye height or close to it. A user or a doll with pointers (e.g., white sticker dots 10) is positioned at a distance from the camera, such that it will eliminate most of the camera distortion when looking at the camera. The scaling of the image can be matched and cropped to represent true size of a supposed reflection at a mirror, or slightly smaller. That is, the generated reference image should match the true size of the user on a mirror placed at the camera location, or smaller to fit the screen if preferred (depend on the size of the screen).

Figure 10B:
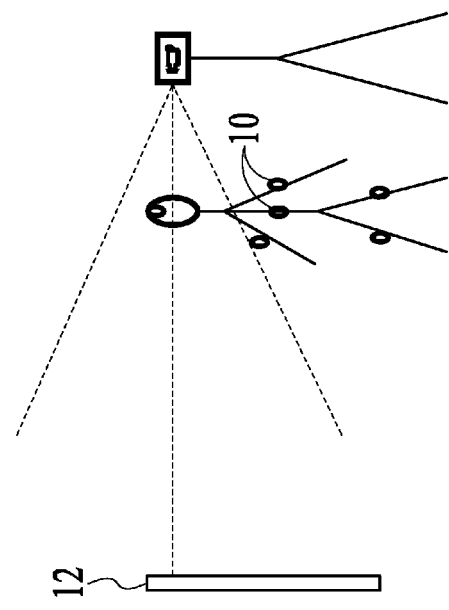

2. In FIG. 10B, a user or a doll with the pointers is positioned in-front of a conventional mirror 12. The camera is positioned at the location of the user and located at eye level of the user, and images the reflection in the mirror. The reference image can also be taken with an array of cameras, e.g., in front of the user in a vertical line, to eliminate distortion. Thereafter, the multiple images are stitched to get a uniform image with high resolution and low distortion. Google glasses can also be an option for calibration in this scenario. The user/target with the camera will take a picture of himself in-front of a regular mirror. Since the FOV is fixed, the only thing that needs to be done is resize the image for true size.

Once the reference image is obtained, another image is taken by placing the camera at its actual service location, e.g., above the screen, which will be referred to herein as the actual image. Then a registration of the reference and actual image is performed, by matching the pointers on the actual image to those of the references image. From the registration information, the transformation that can best bring the distort image to the right eyes and body orientation is extracted. Also, based on actual installation geometry in the field, offsets or correction to the transformation can be added. Based on user distance and eyes point of view, an interpolation of the transformation at any location in front of the camera can be create.

Figure 11:
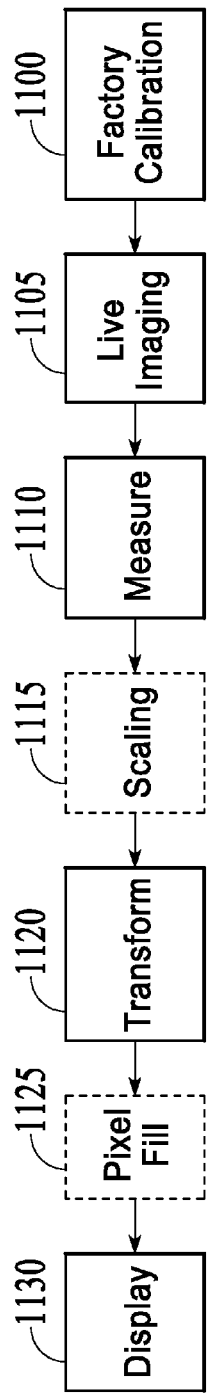
FIG. 11 is a block diagram illustrating a process according to an embodiment of the invention.

FIG. 11 is a block diagram illustrating a process according to an embodiment of the invention, which can be used in the systems described herein. The process begins at 1100, with a factory calibration procedure, which can be implemented using the followings steps as one example. A calibration target is selected, e.g., a doll, a user, a board etc. Target pointers are then placed on the target, for example stickers 10 illustrated in FIG. 10A. The camera is then mounted at its service location, e.g., above the screen and tilted down as illustrated in FIG. 8, and is set to capture the maximum range. Snap shots of the target are taken at multiple locations (i.e., distances, heights, literation offsets, etc.). On the other hand, for simplicity, taking images at multiple distances along the central virtual line in front of the screen would suffice. One or more reference images are then obtained by, for example, either of the methods shown in FIG. 10A or 10B. As one example, the camera is positioned at eye level at the same location of the screen. Then one or more snapshots of the same target are taken, using the same allocated pointers. If only one image is taken, it should be taken at a reasonable distance to avoid camera distortion. If multiple reference images are taken, they should be taken at multiple distances so as to capture the small changes occurring when user approaches the mirror. Note, however, that if multiple target and multiple reference images are obtained, it would be advisable to take them at the same distances and same positions, to generate better transformations. The reference images can be resized to represent a true size on the screen, i.e., to mimic the size that would be reflected in a mirror positioned at the location of the screen.

Once the target and reference images are obtained, the distorted target images that were taken from the tilted camera are registered to the reference image(s) using the pointers, so as to represent how the user would appear at a mirror positioned at the location of the screen. The output of the registration is a transformation operator, e.g., a set of pointers, each having two coordinates: one in the input image and one in the reference image. Various transformations can be tested over multiple target and reference images. For example, multiple distortion functions can be applied to get the best matching performance. The principle functions would be projection, resize, XY translation (offset) and left-to-right flip. The best transformation combination is selected and mapping transformation is created for each calibration point. This mapping transformation is the factory calibration according to which live images in the field would be transformed to mimic a mirror image. It should be appreciated that the mapping may include different transformations for each pixel or each section of the live image, so as to provide the best representation of a mirror reflection.

As can be understood, step 1100 can be implemented in the factory, prior to shipping the system. On the other hand, this procedure may also be done in the field, especially when the camera and the screen are provided as separate elements, such that in different situations the camera may be positioned at different locations with respect to the screen. In such circumstances, it may be beneficial to supply the system with a calibration target, e.g., a doll (3d target) or board with calibration markings (2d target), such that the user may be able to perform the calibration in the field using a standard target. The system would then be pre-programmed to perform the calibration process and generate the transformation mapping in the field.

Once the system is installed in its service location, the process is at step 1105, wherein live image or video of a user is obtained and grabbed by, e.g., a frame grabber. At the same time, the user's location is measured, such that the user's point of view is determined. This can be done using IR measurement technology, or using available sensors, such as, e.g., Kinect®, available from Microsoft®. At step 1115, if needed, optionally a scaling factor is applied to match the screen size and user height.

At step 1120 the appropriate transformation mapping is selected, or a standard factory calibrated mapping is interpolated to create the correct mapping for the user's particular location in front of the screen. The transformation mapping is then applied by the EyesMatch module to the live video. In this context, the term "live" also refers to a video feed that was grabbed by a frame grabber and may reside in a buffer prior to being sent to the monitor screen for presentation. Also, if needed due to the transformation, at step 1125 missing pixels are filled in by interpolation technique. At step 1130 the image is sent from the buffer to the screen to be displayed. It should be appreciated, that due to fast processors available commercially, steps 1105-1130 can be performed in real time, such that the user cannot perceive any delay in presenting the image on the screen, which is referred to herein as "real time" or "live" presentation.

The EyesMatch module can be used to provide a more natural environment that more conform to daily interaction. For example, when making a video call using a PC, such as by using Skype®, since the camera is normally positioned above the monitor, the caller often seems to look away from the camera, since the caller is actually looking at the screen. This provides an unnatural conversation, since the callers are not looking at each other when talking. The EyesMatch module can be used in such application to apply a transformation such that the image displayed on the monitor appears as if the caller was looking directly at the video cam, even if the caller was actually looking at the screen, and thus away from the video cam. The transformation can be done either at the sender or receiver's computer. For example, a user using Skype® may have EyesMatch module installed on his computer, such that whenever the video cam is activated for a video conference, the EyesMatch module intercepts the signal from the video cam and applies the transformation prior to allowing the video to stream to the other user via the Skype application. When the other user receives the video signal, it has already been transposed such that the other user sees the image as if the caller is looking directly at the video cam. The same can be implemented is standard video conference systems, such as WebEx, Polycom, etc.

Figure 12:
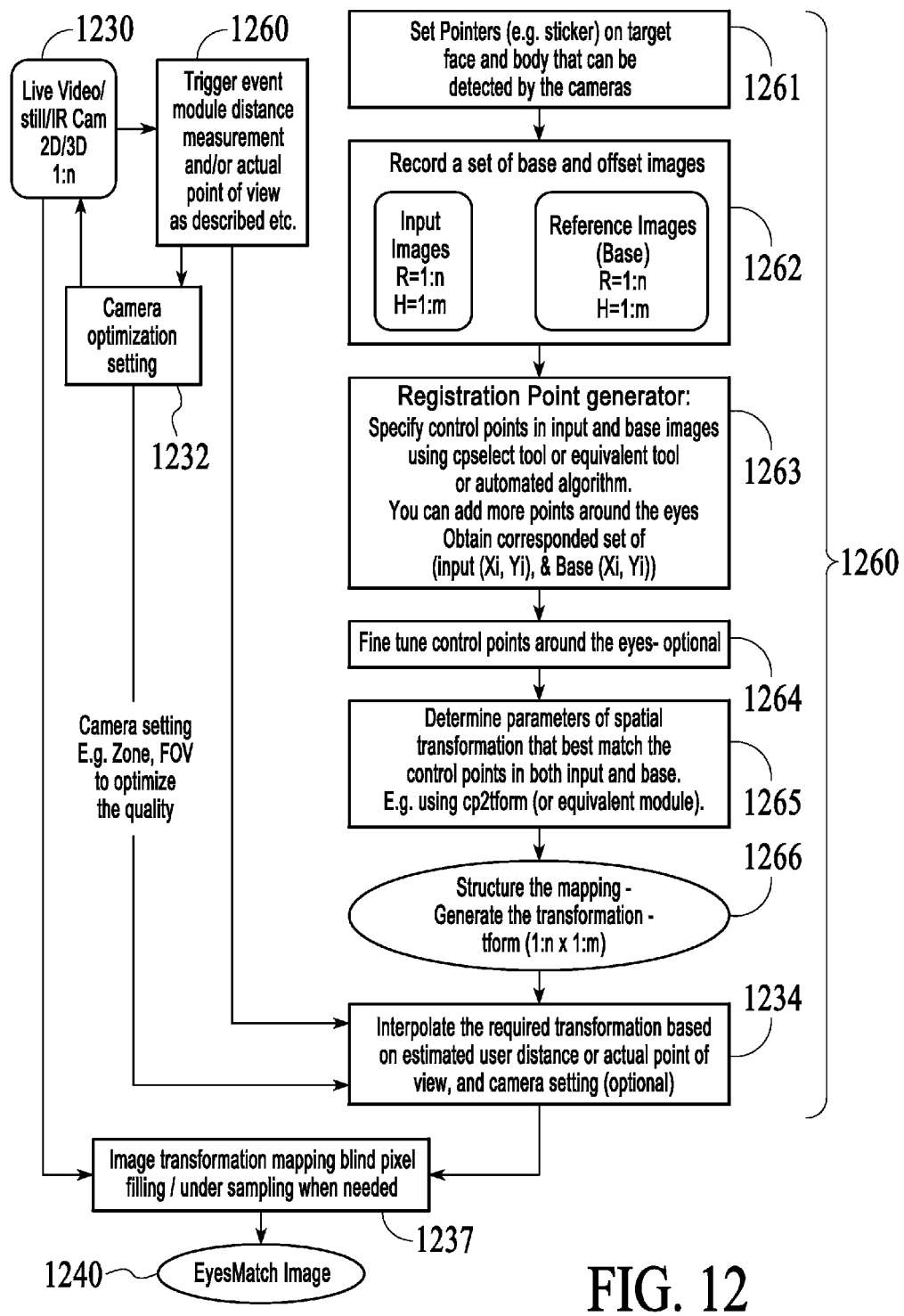
FIG. 12 is a block diagram illustrating modules and processes to perform the calibration and image transformation according to an embodiment of the invention.

FIG. 12 is a block diagram illustrating modules and processes to perform the calibration and image transformation according to an embodiment of the invention. Block 1230 represent the image acquisition module, which may include one or more still or video cameras, an IR camera or distance measurement sensor, a 3D camera arrangement, etc. Module 1232 controls the camera optimization settings, e.g., to obtain the proper FOV, image the proper zone in front of the screen, set focus and/or resolution, etc. Module 1260 is the trigger event module, which can be used to identify the presence of a user in front of the screen and start the image acquisition and transformation process. At other times, the system can be set at idle, showing only a background image on the screen until a user is detected.

Brace 1360 encompasses the calibration procedure, which will be described herein for a system configured for a field installation wherein the camera 1230 is positioned above the display screen 1240, as also exemplified in FIG. 1. The calibration 1260 can be performed in the factory prior to shipment or in the field after installation. At 1261 a target with pointers is positioned and at 1262 one set of reference images are obtained (using, e.g., camera at eye level and looking forward) and a corresponding set of input images are obtained (e.g., using the camera at its field installation position above the screen and pointing downwards. At 1263 pointers from each input image are matched to corresponding pointers in corresponding reference image. So as to generate transformation vectors. Depending on the quality of mirror representation sought, optionally the vectors corresponding to areas around the eyes of a user are fine-tuned at 1264.

Using the matching of the pointers of the input images to the reference images, at 1265 the transformation parameters that lead to the best image matching can be determined and selected. The parameters that can be used for the transformation include the following. A highly effective transformation parameter is a tilt transformation. Tilt transformation corrects the distortion in the image caused by the camera being tilted downwards. The tilt transformation modifies an input image taken with the camera looking downwards and transforms the image to appear as if the camera was pointed straight horizontally (Video engine can also correct azimuth error). Another transformation parameter is elevation translation. The elevation spatial translation transformation linearly modifies offset in an image taken with a camera positioned externally to the screen, e.g., above the screen, and transforms the image to appear as if the image was taken from the screen location at the user's eyes level (match the eye height to the image in the screen height) Horizontal translation can also be apply to correct missalignments between the camera and the center of the screen). Another important transformation for mimicking mirror is scale. As explained above, in an actual mirror reflection the user sees very little change in body image size as the user gets closer to the mirror. Conversely, in a camera image the size changes considerably with distance to the camera. A scale transformation reduces the effect of size change with distance to the screen, so that the user sees almost constant size of himself in the screen, regardless of distance to the screen. Depending on the position and FOV of the camera, an x-y translation of the image may also be required.

In practice, it has been shown that performing tilt, elevation, and scale translations provides a rather convincing image that only needs to be right-to-left reversed to very effectively mimic a mirror reflection. For further improvements, one may also use barrel-effect transformation and fish-eye transformation. Additionally, one may add depth perception to the projected image by adding lighting and shadowing, either artificially by operating on the intensity and/or hue of the image pixels, or physically by controlling illumination elements such as LED's strategically position about the screen or the user. Moreover, a 3D effect can be created either with the use of 3D glasses or using glasses-free 3D technology. In glasses-free 3D technology different sets of images are projected to each eye. Since in the embodiments described the distance to the user and the location of the user's eye are measured or estimated, it makes it easier to project a 3D image to the user by projecting different sets of the images to each of the user's eyes.

At step 1266 a transformation mapping is generated and stored. This transformation mapping will be used at 1234 for transforming live video feeds from imaging 1230, utilizing the estimated distance to the user. Depending on the transformation mapping operation, pixel filling may be needed. For example, using a camera on top of the screen and tilted downwards would require tilt and elevation transformations which would provide an image that can be enhanced using pixel filling. This can be done at 1237, and the resulting image would be presented on the screen at 1240. Applying the transformation and pixel filling onto live video feed can be easily done in real time using the appropriate processing capacity.

Figure 13:
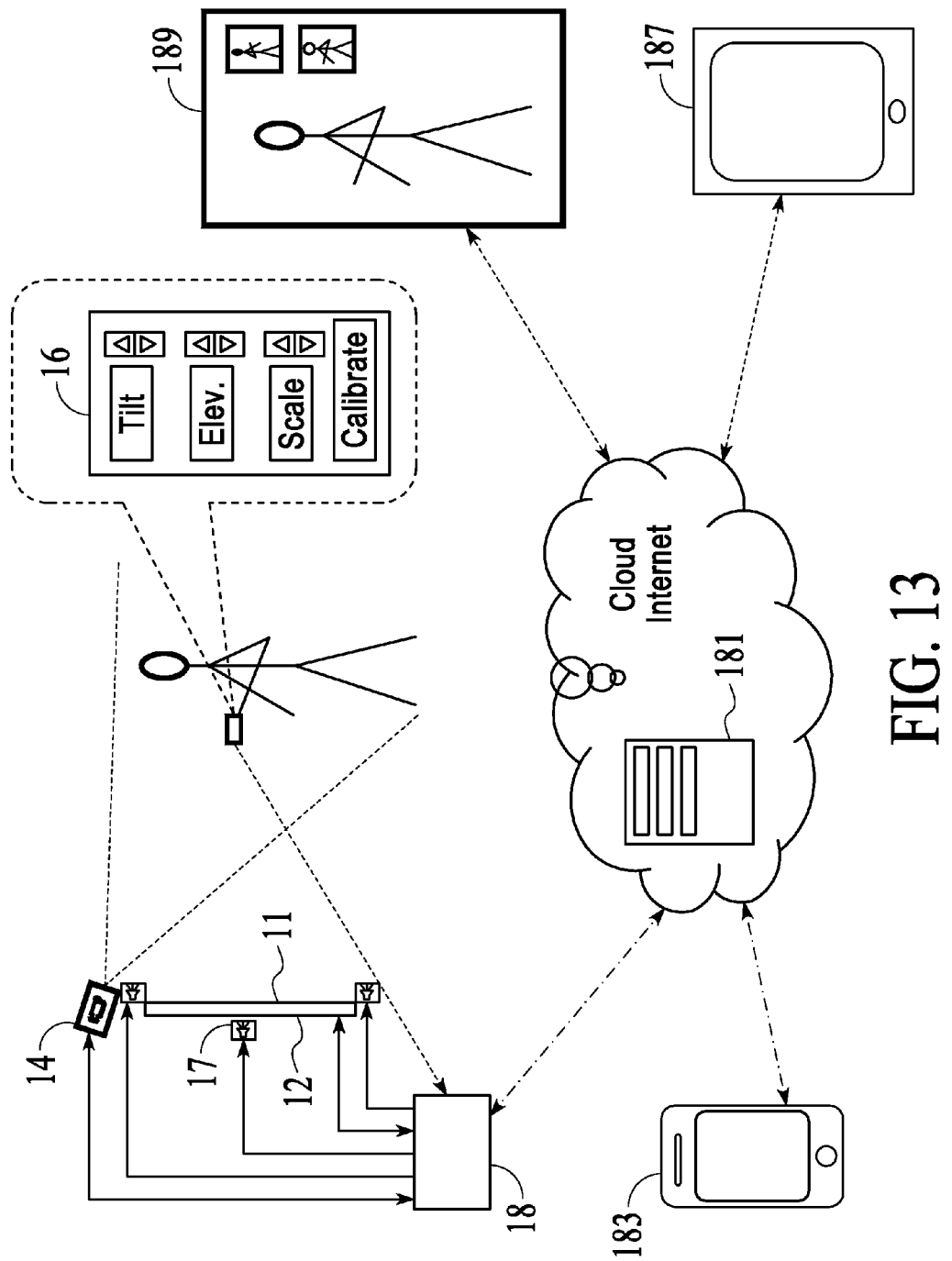
FIG. 13 illustrates another embodiment, wherein calibration and transformation mapping is performed in the field after installation of the system.

FIG. 13 illustrates another embodiment, wherein calibration and transformation mapping is performed in the field after installation of the system. In the example of FIG. 13, camera 14 is positioned above video screen 12 and is tilted downwards. The camera 14 and screen 12 are in communication with and are controlled by controller 18. The user is provided with an input device 16, which may be in communication with controller 18 using wired or wireless technology. The user stands at an appropriate location, e.g., 2-3 meters from the screen 12, and enables the calibration process by, e.g., entering a "calibrate" command from the remote input device 16. During the calibration process, a live video stream is fed from camera 14 to the controller 18, and the controller "flips" the image about a central vertical axis (left to right) prior to displaying it on screen 12. Using the input device, the user acts on the various transformation functions. For example, the input device may include input buttons for correcting tilt, elevation and scale, as schematically illustrated in FIG. 13. The user's input commands are transmitted to the controller 18, which then applies the transformations in real time to the video feed, such that the image is changing in real time in front of the user. The user may change the amount of each transformation function until the user sees a convincing image in the screen, at which point the user may press an input button indicating that calibration is completed. The controller 18 then saves the appropriate calibration parameters and uses these transformation parameters for all future live video feeds.

Another feature illustrated in FIG. 13 is distance calculation. Since the position and tilt of the camera 14 with respect to the screen 12 are known (e.g., due to fixed bracket attaching the camera to the top of the screen), the image captured by the camera 14 can be used for triangulation and distance calculation. For example, when a user appears in a frame of a live video stream captured by camera 14, triangulation to the tips of the user's shoes can be performed in order to calculate the user's distance to the screen 12. This operation can be done every fixed number, n, of frames, such that the user's distance from the screen can be continuously updated to capture user's movement. The background can be updated once there is no user in front of the mirror—adaptive background method.

A further feature illustrated in FIG. 13 is the use of lighting to create depth and/or atmosphere. Specifically, several light sources 17, e.g., LED arrays, can be placed at different locations about the screen 12, and be controlled by controller 18. The light sources 17 can be operated so as to create more depth in the image, e.g., adding shadows and brightly illuminated areas. The light sources 17 can be of different colors, so as to improve the existing lighting and create the appropriate overall "temperature" of the displayed image. The light sources can also be tuned according to the distance to the user, so as to create consistent image and remove artifacts created by the store's illumination. Alternatively, or additionally, color and lighting changes can be done by the controller directly on the digital image received from the camera 14. For example, color transformation can be used to enhance the mirror appearance of the image, e.g., operate on parameters providing an image that is: glossy, crisp, sharp, mat, metallic, etc. The controller 18 can also add virtual spot of lights and/or shadows on the image to create more depth to the image. Also, an anti-reflecting coating is provided on the front of the screen so as to remove and reduce reflections that are normally associated with flat panel displays. The LED Array can be connected to light sensor, and/or to light temperature sensor, and can be predefined to stay in particular levels of light and light temperatures, and will adjust automatically.

According to further embodiments, 3D imaging is implemented with two cameras at a distance D between each other. Distance D is calculated as an average distance between human eyes, generally referred to as interpupillary distance (IPD), which for adults is around 54-68 mm. The transformation will be calculate from registration of image obtained from the input camera at a distance D with an image obtained from two reference (base) cameras at a spatial distance that is also similar to the distance between to user eyes. The base for registration can be taken using a Kinect® or any IR 3D camera. Google glasses can also be an option for calibration, wherein the user/target wearing the Google glasses will take a picture of himself in front of a regular mirror. Since the FOV is fixed, the only thing that needs to be done is resize the image for true size. An image transformation module, such as controller 18, can also apply image resize for zoom in/out to allow the user to fit the image to the screen or to focus on some part.

As can be understood, while some of the above embodiments relate to building the transformation mapping by registering images or other empirical methods, alternatively direct calculations of the distortion between camera and theoretical user point of view can be performed based on analytics. Using analytics voids the need for any registration procedure. Instead, analytical mapping transformation is created to correct for the distortions.

Yet another feature illustrate in FIG. 13 is the use of the Internet or the cloud for providing services relating to the transformation and mirror presentations. For example, according to one embodiment, the transformation can actually be performed in the cloud, if a sufficiently fast connection exists. In such a case, the feed from the camera 14 can be fed to server 181, which applies the transformation and sends it back to controller 18 for display on monitor screen 11.

According to another embodiment, the images from camera 14 or transformed images from camera 14 can be stored in the cloud and streamed to devices, such as smartphone 183, tablet 187, and another monitor screen 189, such as a flat panel TV. This can be done in real time while the user is trying on outfit, such that the user can share the experience and get input from others at remote locations. Also, once the user leaves the store, the user can have access to all the images taken by using a smartphone, tables, PC, etc. Note that for ease of user interface, as shown in monitor 189 of FIG. 13, thumbnail images of various tries can be displayed together with the current image, to enable the user to choose among views.

Figure 14:
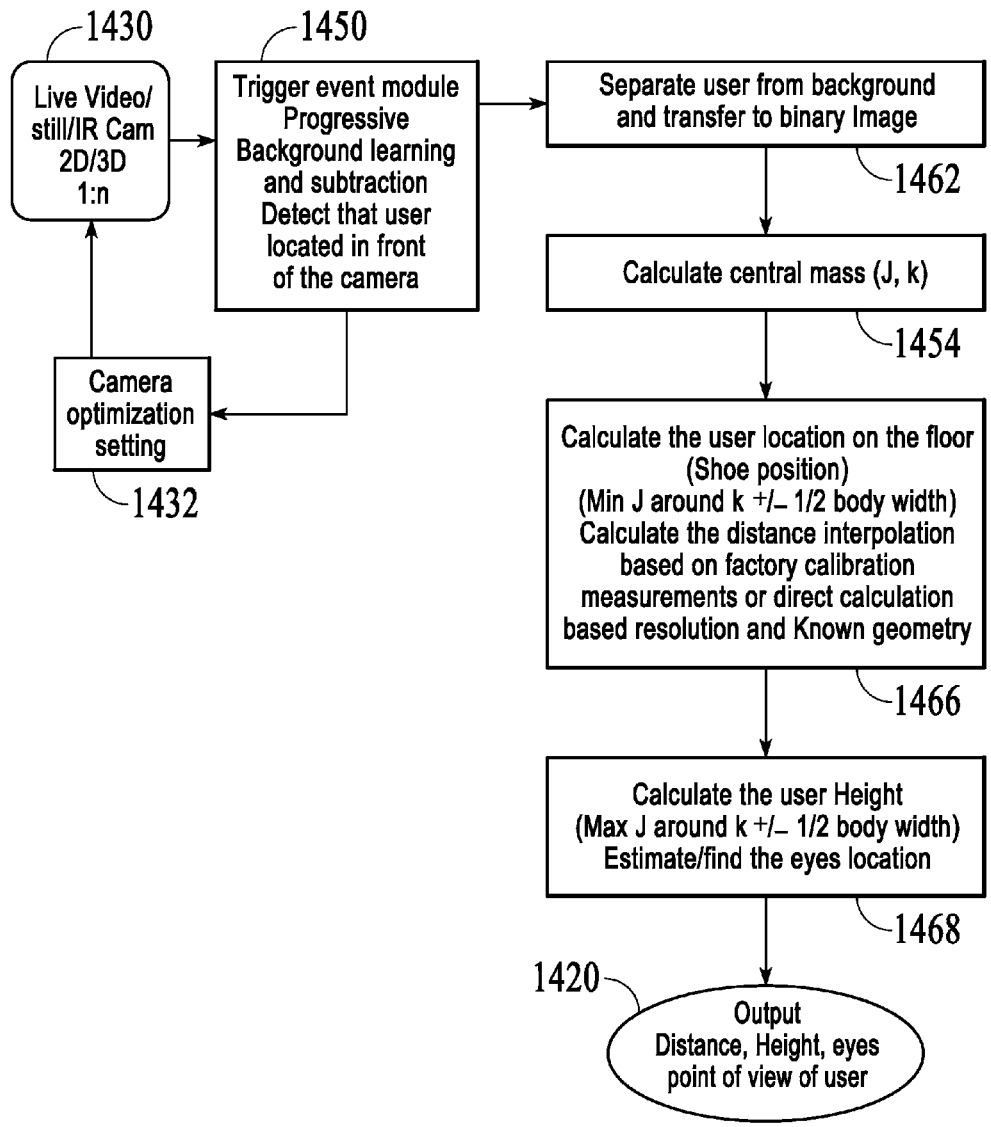
FIG. 14 illustrates an embodiment for extracting data from the image of camera.

FIG. 14 illustrates an embodiment for extracting data from the image of camera 1430. The trigger event module 1450 detects the presence of a user and activates the process for extracting the data. A camera optimization module 1432 can be used to control the camera to obtain the best image for the data extraction. In this embodiment, when the camera 1430 is located above the screen and pointed down, it can see the user's shoes from, e.g., 1 m to 4 m from the screen. However, since the camera is pointed down and the shoes are at a high distance from the camera compared with the user's head, the distortion is at the maximum. With the transformation mapping discussed above a compelling distortion improvement is achieved at all distances.

Additionally, according to this embodiment, the image of the user is separated from the background at 1462. At 1464 the central mass is calculated by multiplying the binary image of the user only by index matrix, and then taking the mean of the pixels index. Also, the min. body pixel below central mass (J,k) is determined by opening a window around k (central mass) and finding the lower active index—which can be assumed to represent the edge of the shoes. At 1468 the user's height is calculated by finding the top of the head and, based on the distance camera resolution, FOV, and the camera geometric tilt, the user's height is estimated.

Figure 15:
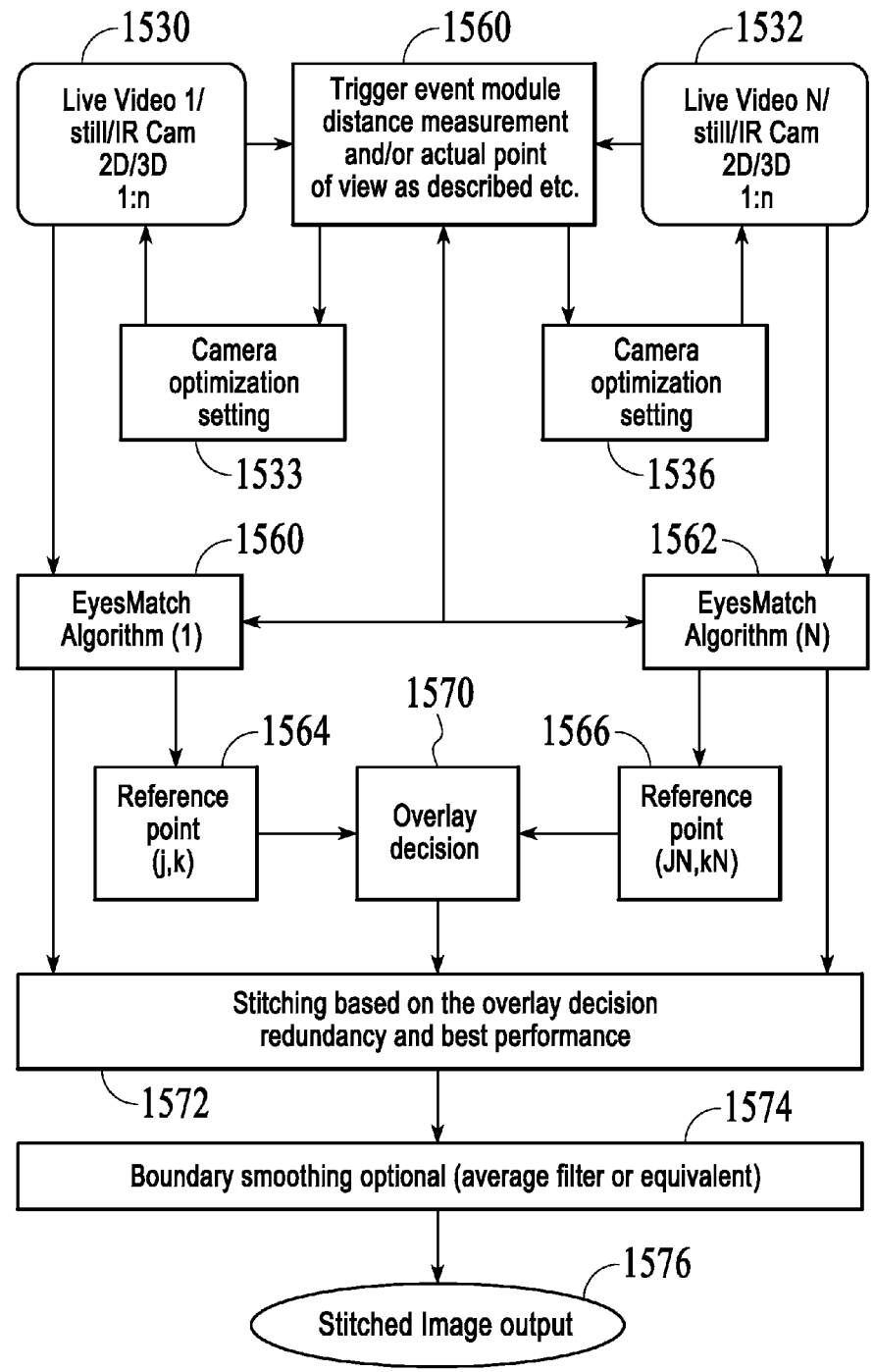
FIG. 15 illustrates an embodiment wherein stitching of images from n cameras is performed.

FIG. 15 illustrates an embodiment wherein stitching of images from n cameras is performed. Stitching is particularly beneficial for improving the image resolution and FoV when the user is approaching closer to the screen. In the embodiment of FIG. 15, the live feeds 1530, 1532, of n cameras, 1:n, are stitched together. Trigger event module 1560 may be used to trigger stitching when a user is detected in front of the screen. Also, distance measurement may be supplied, either a single value representing an average distance to the user, or multiple values, e.g., one distance value for each camera. Conversely, or in addition, multiple distance values may be provided to indicate different distances of different body part.

Each camera may undergo separate camera optimization, 1533, 1536, and the feeds from each camera would go through a different geometrical transformation, 1560, 1562, since the location and orientation of the cameras are different relative to the user point of view, 1564, 1562. Overlay decision 1570 is the decision element to determine where will be best to perform the stitching. If we are dealing with scenario with two cameras one located above and one below the screen, the overlay decision will indicate the index of the best cut. Since we have distance measurement constantly, it is possible to maintain the stitching line almost fixed once user approach the mirror. For maximum performance the stitching 1572 needs to be optimized based on the user's distance from the cameras. Smoothing 1574 is needed to filter out the lines that may be generated at the intersections of different images from different cameras. The images from different cameras would be slightly different due to differences in absolute quality and in lightning, and due to different distortion correction for each camera. Interleaving between the images on multiple rows can be used to ease the lighting affect. The stitched image is output at 1576.

In the above described embodiments, the transformation mapping corrected the image obtained by the cameras and provided an image that mimics an image that would have reflected from a mirror. The following embodiment, illustrated in FIG. 16, improves the quality of the eyes' presentation. The idea behind this embodiment is to override the eyes zone, or just the eyes, with modified pixels that will create the feeling of broadside view—i.e., presenting the eyes to their fullest mimicking the user looking directly at himself in the mirror. As can be understood, the user would be looking directly at himself projected in the screen, but since the camera is not positioned at eye level pointing horizontally, the user's eye as captured by the camera would not be seen looking straight ahead. The embodiment of FIG. 16 corrects this problem.

Figure 16:
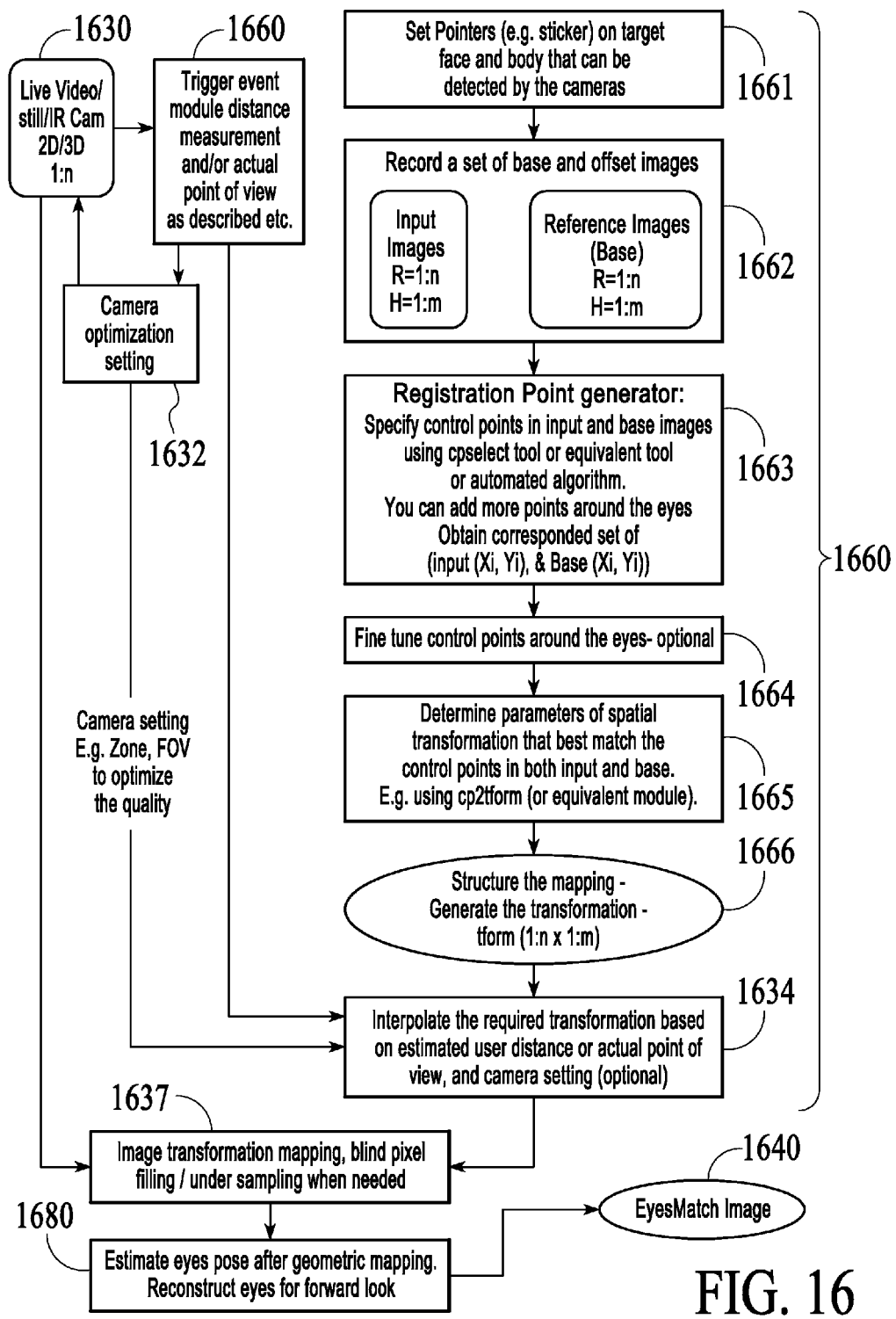
FIG. 16 illustrates an embodiment for presenting the eyes to their fullest, mimicking the user looking directly at himself in the mirror.

The majority of the elements in FIG. 16 are similar to that of FIG. 12 and have the same reference, except that it is in the 16xx series. These elements will not be described here again. Instead, attention is directed to element 1680, which is responsible for the eyes correction. Since the scaling has already been correct by the prior elements, what needs to be done at this stage is to fix and/or reconstruct the internal eyes elements, e.g., pupil, iris, etc., so as to present the proper image.

Module 1680 first locates the eyes in the image and makes sure that the user does indeed look at the screen. The information for this step and for the corrections can be deduced from historical images, estimations for regular statistical eyes proportions, or actual measurement when the user looks directly at the camera or once the user is standing far enough from the screen where the distortion is relatively low after the transformation mapping. If the user is found to be looking at the screen, the pixels corresponding to the eyes area are either transformed or actually replaced by pixels that position the iris and pupil at the center of the eye, looking forward. Also, the sclera may be enlarged, to mimic straight-on view, especially if the camera is positioned above and pointed downwards.

Another feature that may be implemented in any of the above described embodiments is the frequency of transformation parameter update. That is, at times the user may prefer a stable image when he is standing stationary in front of the screen that mimics the mirror. Having the transformation mapping engine change while user is stationary may create an uncomfortable feeling. On the other hand, when the user is moving faster toward or backward from the screen, it may be fine to update the transformation parameters faster. Accordingly, according to this feature, multiple behavior zones are established. According to one embodiment, the behavior zones are set according to distance only. For example, when the user is moving more than a set distance amount, the video engine is updated. According to one embodiment, if the user moved an amount of less than, say 25 cm, the transformation mapping is performed at a lower speed, say every x seconds, while if the user moved more than 25 cm, the transformation mapping is updating the parameters at a second, faster speed. According to another embodiment, the zones are set according to the user's movement speed. For example, if it is determined that the user is moving less than x cm/s, then a first transform updating frequency is implements, while if the user moves faster, a second, faster updating frequency is used.

Thus, as can be understood from the above, while a real time video engine update may be used to image the user, the presentation transformation on the monitor screen may not be necessarily changing in real time, depending on the user's behavior. For example, is the user is relatively stationary or moves very slow, transformed parameters can vary in a semi-real time. Then, when the user starts to move faster or a large distance, the video engine may be updated more frequently.

It should be appreciated that the embodiments described above may be implemented using a digital (e.g., video) camera and a monitor, wherein the images from the camera are fed to a processor. The processor applies the transformation mapping to the images and display images in either a display mode or a mirror mode on the monitor. From the above description it should be appreciated that the mirror mode may be implemented by displaying on the monitor the live video feed, as modified by the transformation mapping. That is, in mirror mode the image that is being displayed on the monitor is an image/video of the user taken in real time. Conversely, in display mode the image that is being displayed is an image/video obtained in the past and taken from storage. The stored images may be either the raw images as fed from the camera or already transformed images. In either case, the prior images that are being displayed in a display mode are transformed images. Therefore, if the stored images are the raw images, the processor applies the transformation mapping prior to displaying the images on the monitor.

Whether the system operates in a display or mirror mode can be considered as a temporal issue: during mirror mode, the image that is being shown on the monitor is a transformed image of what the camera sees at that particular moment (or at a de minimis or unnoticeable earlier time), while during display mode the image that is being shown is a transformed image of what the camera or other camera saw earlier and is different than what the camera sees now. This issue also relates to perception: during mirror mode, since the monitor shows a transformed image of what the camera sees now, the user observing the monitor has the perception that he is looking at a mirror, while during the display mode the user observing the monitor has the perception of observing a video of events that took place in the past.

It should be appreciated that the system can be implemented separate and irrespective of the monitor screen. For example, in some locations (e.g., dressing room), only the monitor screen may be installed, without any camera. The monitor is configured to communicate with the system so as to download and display stored images. The user may interact with the monitor to view prior images taken, e.g., to compare with current outfit. As another example, all of the images taken can be uploaded to the cloud, such that a user may view the images on a PC or mobile device, such as using an app on a tablet.

As can be understood from the above description, various embodiments of the invention provide an image transformation apparatus that comprises an image input port for receiving digital images from a camera; a transposed image output port for outputting transposed images to be displayed on a monitor or stored in memory; and a transposition module that is programmed to receive images from the input port and apply a transformation to the images, wherein the transformation includes at least flipping the image about a vertical axis so as to reverse right and left sides of the image; applying a transformation mapping to the image to modify the image such that it appears to mimic a reflection of a mirror; resizing the image to reduce variations caused by changes in object's distance to the camera. In other embodiments, a program is provided that when operated on a computer causes the computer to transpose a digital image obtained from a camera, such that the transposed image resembles a reflection from a mirror, the transposition including at least flipping the image about a vertical axis so as to reverse right and left sides of the image; applying a transformation mapping to the image to modify the image such that it appears to mimic a reflection of a mirror; resizing the image to reduce variations caused by changes in object's distance to the camera. The program can be operated in any general purpose computer, such as a server, a PC, a tablet, a smartphone, etc.

According to further embodiments, a system is provided which enables a user to view self image on a digital screen by having the digital screen project an image mimicking a mirror image. The system includes a digital camera generating a stream of images of the user; a controller having an image input port to receive the stream of images from the camera and applying a transformation to the images to generate transformed images mimicking a reflection of the user in a mirror; the controller having an output port for outputting a stream of transposed images to be displayed on a monitor; and a storage facility to store the transformed images. The controller further having an Internet connection for uploading the stream of transposed images to the cloud. The system further having clients enabling download and viewing of the transformed images from the cloud.

In various embodiments, a controller applies a transformation to a stream of images, which includes: flipping the image about a vertical axis so as to reverse right and left sides of the image; applying a transformation mapping to the image to modify the image such that it appears to mimic a reflection of a mirror; and resizing the image to reduce variations caused by changes in object's distance to the camera. The mapping essentially reassigns new addresses to each pixel of the original image. The transformation mapping renders an image appearing to have been taken from a camera positioned at eye-level height and pointing horizontally. The transformation mapping comprises at least a tilt transformation and an elevation transformation, wherein a tilt transformation transforms the image to resemble tilting of the camera and the elevation transformation transforms the image to resemble changing the elevation of the camera.

The transformation mapping can be one that includes angle, tilt, azimuth, scale, spatial translation (i.e., elevation linear offset or horizontal offset) etc. The final transformation is a matrix multiplication of the individual transformation to generate the individual distortions.

In other embodiments a system is provided for enhancing video conferencing or video calling. The system includes a transformation engine to transform a stream of images taken from a video camera positioned about a periphery of a monitor screen, such that images of a user looking directly at the screen portray a user not looking directly at the camera. The transformation engine receives the stream of images and transforms the images so as to provide images showing the user looking directly at the camera. The transformation includes any combination of correction for angle, tilt, azimuth, scale, spatial translation (i.e., elevation linear offset or horizontal offset), etc. The transformation may also include override the eyes zone, or just the eyes, with modified pixels that will create the feeling of broadside view—i.e., presenting the eyes to their fullest mimicking the user looking directly at the camera.

In various implementations, the method further comprises calculating distance to a user appearing in the image by tracking the distance between the user's eyes or the head size, and scaling the image accordingly. For example, according to one embodiment, the system is programmed with an expected distance between the user's eyes, i.e., interpupillary distance (IPD), at an average distance from the camera. The 95 percentile adult male in the USA has an IPD of 70 mm, while for females it is 65 mm. When a user is sensed in front of the camera, the system may first determine whether it is a male or female, or simply go directly the distance measurement program and use an average IPD number, e.g., 68 mm. For the range measurement, the system identifies the pupils in the image, and scale the image so as to match the expected IPD. As video images continue to stream, the system scales the image to maintain the IPD constant and matching the expected IPD. In this manner, when the user moves away or closer to the camera, the size of the user in the image projected on the monitor screen would remain about the same, thus mimicking a reflection on a mirror. As can be understood, the system can use other standard measurements, such as distance between ears, etc., but using the eyes would make it simpler since the system can recognize the eyes pretty easily. However, if the user wears shades, the system may have to resort to other measurements based on other body parts. This switch can be done dynamically, i.e., if the system finds the eyes, it uses IPD, but if not, it falls back to other body parts.

Also, effect filters can be applied, such as lighting filter effect, reflective texture effect, color spectrum filter to create metallic feeling, etc. Similarly, the camera's shutter timing, sensor gain, whitebalance, and any of their combinations can be controlled to modify the resulting image. In various embodiments, these parameters are controlled based on a dynamic region of interest (Dynamic RIO), such that the changes applied to the parameters relate only to a selected region in the image, and not the entire image. For example, the parameters can be modified and updated based on the distance to the user and limited to an ROI which is a window around the user. For example, the user's image can be separated from the background, and the parameters applied only to the pixels belonging to the user's image.

In further implementations, enhanced real time video effect is implemented by, e.g., recording a video with a high resolution camera at a first frame rate, and manipulating the display in a higher frame rate so as to smooth the video. Additionally, the background of the received video stream can be replaced with an artificial background stored in the system. Additional video processing can be used to add or change color or texture of accessory or other element in the image. Also, for video conferencing and other applications the transformation can be performed without vertical flipping of the image.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for operating a system having a monitor, a camera, and a processor, so as to display a mirror-mimicking image on the monitor, by performing non-ordered steps comprising: obtaining a digital image from a camera; flipping the image about a vertical axis so as to reverse right and left sides of the image; applying a transformation mapping to the image to modify the image such that it appears to mimic a reflection of a mirror; resizing the image to reduce variations caused by changes in object's distance to the camera; displaying the image on the monitor after performing the flipping, transformation mapping, and resizing; wherein the non-ordered steps are performed on a series of images of a live video feed from the camera; determining distance to a user appearing in the live video feed; and, varying rate at which the non-ordered steps are performed on the series of images according to the distance.

2. The method of claim 1, wherein the transformation mapping renders an image appearing to have been taken from a camera positioned at eye-level height and pointing horizontally.

3. The method of claim 1, wherein the transformation mapping comprises at least a tilt transformation and an elevation transformation.

4. The method of claim 3, wherein the tilt transformation modifies an input image taken with a non-horizontally pointing camera and transforming the image to appear as if the camera was pointed straight horizontally.

5. The method of claim 3, wherein the elevation transformation modifies an input image taken with a camera positioned at arbitrary height and transforming the image to appear as if the camera was positioned at a user's eye level.

6. The method of claim 1, wherein the step of resizing the image is performed integral to the step of applying the transformation mapping.

7. The method of claim 1, further comprising the steps:
obtaining a reference image;
performing registration of the digital image with the reference image;
using data obtained from the registration to generate the transformation mapping.

8. The method of claim 1, further comprising applying a translation transformation to move the image within display area of the monitor.

9. The method of claim 1, further comprising changing illumination intensity of individual or groups of pixels of the monitor, so as to enhance shading or illumination in the image.

10. The method of claim 1, further comprising applying at least one of a barrel-effect transformation and a fish-eye transformation.

11. The method of claim 1, further comprising:
determining distance to a user appearing in the image; and,
varying resolution of the image according to the distance.

12. The method of claim 1, further comprising a step of pixel filling, wherein pixel image is extrapolated into empty pixels left after applying the transformation mapping.

13. The method of claim 1, further comprising the steps:
obtaining a second digital image from a second camera;
flipping the second image about a vertical axis so as to reverse right and left sides of the second image;
applying a transformation mapping to the second image to modify the second image such that it appears to mimic a reflection of a mirror;
resizing the second image to reduce variations caused by changes in object's distance to the second camera;
stitching the image and the second image after performing the flipping, transformation mapping, and resizing, to thereby obtain a stitched image;
displaying the stitched image on the monitor.

14. The method of claim 13, wherein field of views of the camera and of the second camera overlap, and further comprising the step of overlay decision to determine best location in overlapping parts of the field of views to perform the stitching.

15. The method of claim 14, further comprising a smoothing operation to correct artifacts caused by the step of stitching.

16. The method of claim 1, further comprising the steps:
obtaining a second digital image from a second camera;
flipping the second image about a vertical axis so as to reverse right and left sides of the second image;
applying a transformation mapping to the second image to modify the second image such that it appears to mimic a reflection of a mirror;
resizing the second image to reduce variations caused by changes in object's distance to the second camera;
displaying the image and the second image after performing the flipping, transformation mapping, and resizing, to thereby obtain a three-dimensional image on the monitor.

17. The method of claim 1, storing the live video feed in a digital storage device and selectively operating the system in one of a mirror mode or display mode, wherein during mirror mode displaying on the monitor transformed images of what the camera sees at that particular moment while during display mode displaying on the monitor a transformed images of what the camera saw in the past and obtained from the digital storage device.

18. The method of claim 1, further comprising calculating distance to a user appearing in the image by identifying user's shoes and triangulating to the shoes.

* * * * *